United States Patent
Fujimatsu et al.

(10) Patent No.: US 10,051,244 B2
(45) Date of Patent: Aug. 14, 2018

(54) DISPLAY IMAGE FORMATION DEVICE AND DISPLAY IMAGE FORMATION METHOD

(71) Applicant: PANASONIC INTELLECTUAL PROPERTY MANAGEMENT CO., LTD., Osaka-Shi (JP)

(72) Inventors: Takeshi Fujimatsu, Kanagawa (JP); Michio Miwa, Chiba (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 409 days.

(21) Appl. No.: 14/395,910

(22) PCT Filed: Apr. 24, 2013

(86) PCT No.: PCT/JP2013/002777
§ 371 (c)(1),
(2) Date: Oct. 21, 2014

(87) PCT Pub. No.: WO2013/168387
PCT Pub. Date: Nov. 14, 2013

(65) Prior Publication Data
US 2015/0109452 A1   Apr. 23, 2015

(30) Foreign Application Priority Data

May 8, 2012 (JP) ................. 2012-106735

(51) Int. Cl.
*H04N 7/18* (2006.01)
*G06T 3/00* (2006.01)
(Continued)

(52) U.S. Cl.
CPC ........... *H04N 7/181* (2013.01); *G06T 3/0018* (2013.01); *G06T 3/4038* (2013.01);
(Continued)

(58) Field of Classification Search
CPC .............. H04N 7/181; G08B 13/19682; G08B 13/19641; G08B 13/19689; G06T 3/4038; G06T 3/0018
See application file for complete search history.

(56) References Cited

U.S. PATENT DOCUMENTS 6,359,647 B1 * 3/2002 Sengupta ......... G08B 13/19608
348/143
6,954,224 B1 * 10/2005 Okada ................ H04N 5/23203
348/143
(Continued)

FOREIGN PATENT DOCUMENTS

EP   1045580   10/2000
JP   08-154197   6/1996
(Continued)

OTHER PUBLICATIONS

European Search Report in European Patent Application No. 13786989.7, dated Apr. 10, 2015.
(Continued)

*Primary Examiner* — Dave Czekaj
*Assistant Examiner* — Alison Slater
(74) *Attorney, Agent, or Firm* — Greenblum & Bernstein, P.L.C.

(57) ABSTRACT

A display image formation device enables, in an intuitive manner, designation of a location which the user wishes to see when multiple panoramic images obtained by multiple panoramic cameras are present, and enables display of the image for a designated site in a suitable state. One panoramic camera is selected from multiple panoramic cameras on the basis of the positional relationship between a designated position on a planar map and the multiple panoramic cameras. An extracted image region, which is extracted from the image photographed by the selected panoramic camera,
(Continued)

is determined. A display image is generated such that the extracted image is arranged on the planar map.

11 Claims, 37 Drawing Sheets

(51) Int. Cl.
   *G06T 3/40* (2006.01)
   *G08B 13/196* (2006.01)
(52) U.S. Cl.
   CPC . *G08B 13/19641* (2013.01); *G08B 13/19682* (2013.01); *G08B 13/19689* (2013.01)

(56) References Cited

U.S. PATENT DOCUMENTS

| | | | | |
|---|---|---|---|---|
| 7,839,926 B1* | 11/2010 | Metzger | ............... | H04N 5/144 375/240.01 |
| 8,270,767 B2* | 9/2012 | Park | ............... | G08B 13/19641 345/420 |
| 8,274,564 B2* | 9/2012 | Girgensohn | ............ | H04N 5/247 348/143 |
| 2003/0202101 A1* | 10/2003 | Monroe | ............ | G08B 13/19689 348/156 |
| 2008/0049123 A1* | 2/2008 | Gloudemans | .......... | H04N 5/222 348/239 |
| 2009/0024963 A1* | 1/2009 | Lindley | ............... | G06T 19/00 715/839 |
| 2009/0262206 A1* | 10/2009 | Park | ............... | G08B 13/19641 348/218.1 |
| 2010/0171826 A1* | 7/2010 | Hamilton | ............... | G06Q 30/06 348/135 |
| 2010/0228526 A1* | 9/2010 | Moore, III | ............. | G06Q 30/02 703/1 |
| 2011/0058036 A1* | 3/2011 | Metzger | ............... | H04N 7/181 348/143 |
| 2011/0087988 A1* | 4/2011 | Ray | ............... | G06Q 10/06 715/771 |
| 2011/0137561 A1* | 6/2011 | Kankainen | ............ | G01S 5/0247 701/300 |
| 2011/0291831 A1* | 12/2011 | Subbian | ............ | G08B 13/19682 340/541 |
| 2012/0119879 A1* | 5/2012 | Estes | ............... | G08B 13/19641 340/8.1 |
| 2012/0188375 A1* | 7/2012 | Funabashi | ............ | G07C 5/0866 348/148 |
| 2012/0307067 A1* | 12/2012 | Chen | ............... | H04N 7/181 348/159 |
| 2013/0006525 A1* | 1/2013 | Stroila | ............... | G01C 21/20 701/434 |

FOREIGN PATENT DOCUMENTS

| | | |
|---|---|---|
| JP | 2004-153492 | 5/2004 |
| JP | 2005-123750 | 5/2005 |
| JP | 2005-192057 | 7/2005 |
| JP | 2010-272958 | 12/2010 |

OTHER PUBLICATIONS

International Search Report from PCT/JP2013/002777, dated Jun. 18, 2013.

Official Communication in corresponding European Patent Application No. 13786989.7, dated Jun. 22, 2018.

\* cited by examiner

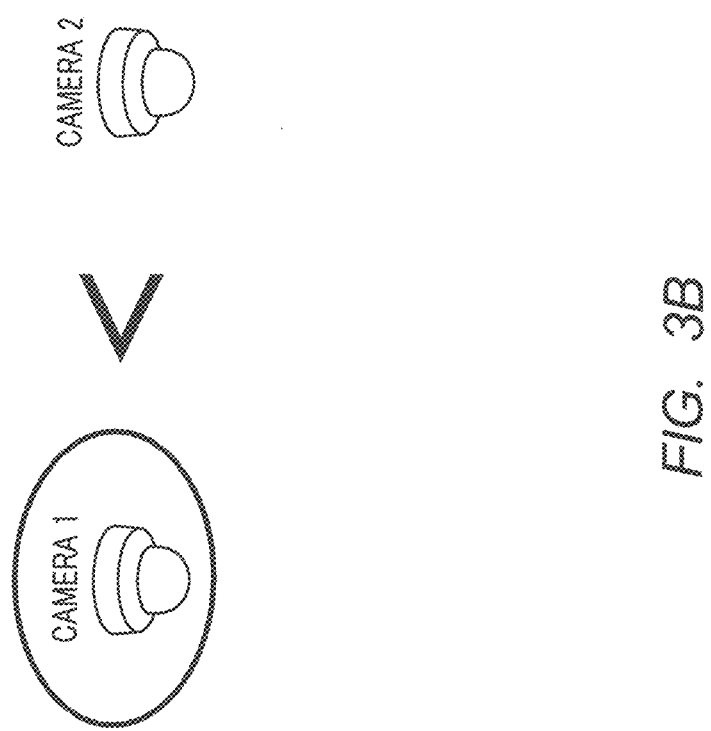

DISPLAY IMAGE FORMATION DEVICE AND DISPLAY IMAGE FORMATION METHOD

TECHNICAL FIELD

The present invention relates to a display image formation apparatus and a display image formation method for displaying an image captured by an omni-directional camera.

BACKGROUND ART

Omni-directional cameras (may also be said to be "all-around view camera") can acquire images in a wide range of field of view using a single camera, and are therefore used in a variety of fields. Omni-directional cameras are used, for example, for a monitoring system. Omni-directional cameras can acquire omni-directional images using an all-around view lens optical system such as a fish-eye lens or an all-around view mirror optical system such as a spherical mirror.

There are various display modes of an omni-directional image acquired using an omni-directional camera such as a mode in which an omni-directional image is displayed developed into a panoramic image and a mode in which a region including a target object is extracted from an onmi-directional image and displayed. In the mode in which a region including a target object is extracted from an omni-directional image and displayed, a user designates an extraction position from the omni-directional image, and the image at the designated position is subjected to distortion correction processing and displayed on a monitor. Note that when an omni-directional image is displayed, the image is generally subjected to distortion correction.

Here, PTL 1 discloses a display method and an apparatus that allow a user to intuitively designate a desired extraction position from an image obtained by an omni-directional camera. More specifically, an omni-directional image is subjected to coordinate transformation and displayed on a monitor so that the x-axis and y-axis which are orthogonal to each other on an actual plane (in the omni-directional image, these x-axis and y-axis are not orthogonal to each other) are also orthogonal to each other on the display monitor. Actually, a plan map in which the actual x-axis and y-axis are orthogonal to each other is set, pixels of the omni-directional image are subjected to coordinate transformation so as to correspond to each position on the plan map and displayed on the plan map (hereinafter, an image transformed into coordinates on the plan map and displayed will be referred to as "map image").

By so doing, it is possible to display an omni-directional image whose positional relationship is easy to understand on the plan map and intuitively select an extraction position as well.

CITATION LIST

Patent Literature

PTL 1
Japanese Patent Application Laid-Open No. 2005-192057

SUMMARY OF INVENTION

Technical Problem

PTL 1 presupposes that a region designated by a user is extracted from an omni-directional image obtained using one camera and displayed.

On the other hand, a system may also be considered in which images of a certain range are captured using a plurality of omni-directional cameras and a region designated by a user is extracted and displayed. However, when there are a plurality of omni-directional images captured using a plurality of omni-directional cameras, conventionally sufficient considerations have not been given as to how to designate and display a region the user wants to see.

An object of the present invention is to provide a display image formation apparatus and a display image formation method that allow, when there are a plurality of omni-directional images obtained using a plurality of omni-directional cameras, a user to intuitively designate a place the user wants to see and that allow an image of the designated location to be displayed in a preferable condition.

Solution to Problem

A display image formation apparatus according to an aspect of the present invention includes: a camera selection section that selects one omni-directional camera from among a plurality of omni-directional cameras based on a positional relationship between a designated position on a plan map and positions of the plurality of omni-directional cameras; an extraction region determining section that determines an extracted image region to be extracted from an image captured by the omni-directional camera selected by the camera selection section; and a drawing section that forms a display image including the extracted image placed on the plan map.

Advantageous Effects of Invention

According to the present invention, it is possible to allow a user to intuitively designate a place the user wants to see and allow an image of the designated location to be displayed in a preferable condition.

BRIEF DESCRIPTION OF DRAWINGS

FIGS. 3A to 3E illustrate a flow of processing example 1.

DESCRIPTION OF EMBODIMENT

Hereinafter, an embodiment of the present invention will be described in detail with reference to the accompanying drawings.

<Configuration>

Figure 1:
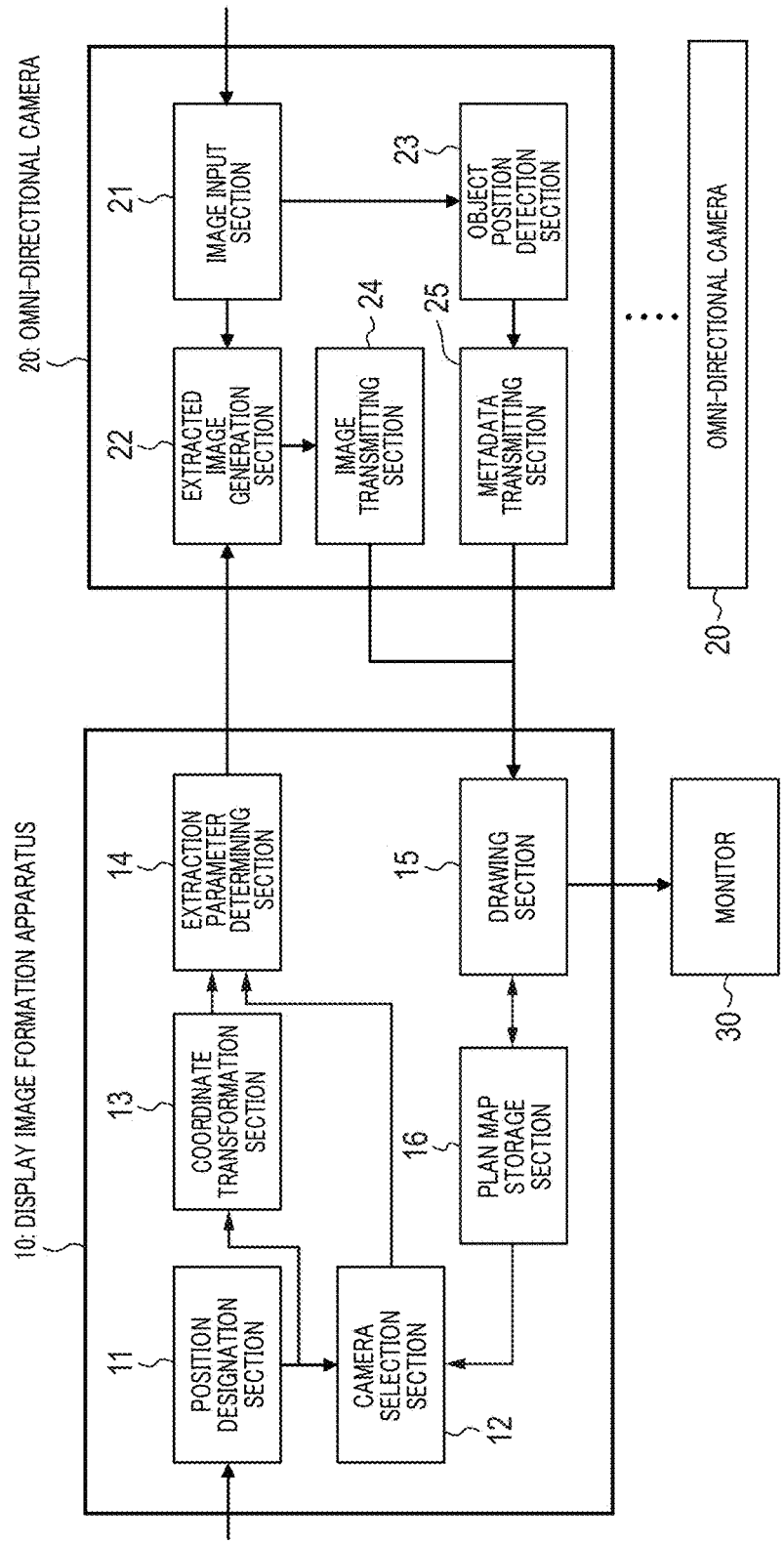
FIG. 1 is a block diagram illustrating a main configuration of an embodiment.

FIG. 1 illustrates a main configuration of display image formation apparatus 10 and omni-directional camera 20 according to the embodiment. Display image formation apparatus 10 and a plurality of omni-directional cameras 20 are connected wired or wirelessly.

Figure 2:
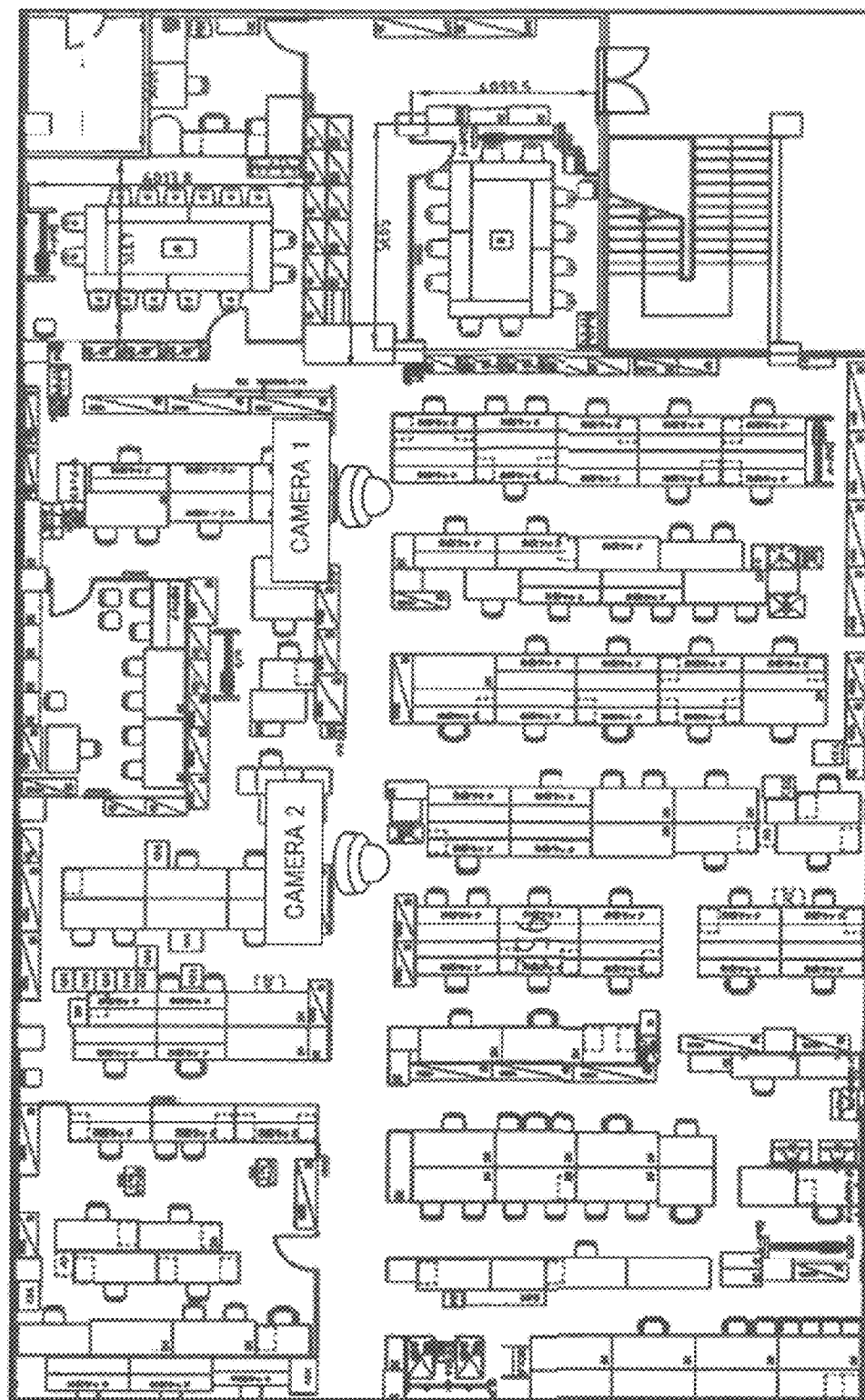
FIG. 2 illustrates an example of layout of omni-directional cameras.

Display image formation apparatus 10 forms an image to be displayed on monitor 30 from a plurality of omni-directional images obtained using a plurality of omni-directional cameras 20. FIG. 2 illustrates an example of layout of omni-directional cameras according to the present embodiment in an actual office. In the example of the present embodiment, images of the inside of the office are captured by two omni-directional cameras (cameras 1 and 2). Cameras 1 and 2 are installed in a diagonally downward direction, for example, on a ceiling of the office.

In display image formation apparatus 10, position information designated by the user is inputted to position designation section 11. Here, plan map storage section 16 of display image formation apparatus 10 stores a plan map as shown in FIG. 2. The plan map is drawn by drawing section 15, is stored in plan map storage section 16 and is also displayed on monitor 30.

The position information inputted to position designation section 11 is coordinate information on the plan map designated by the user while viewing the plan map as shown in FIG. 2 displayed on monitor 30. More specifically, position designation section 11 is connected to an operation input section such as a mouse and a touch panel, and position information obtained by the user operating the operation input section is inputted to position designation section 11. Note that position designation section 11 itself may also be the operation input section such as a mouse and a touch panel. Position designation section 11 outputs the designated position information to camera selection section 12 and coordinate transformation section 13.

Plan map storage section 16 stores the plan map shown in FIG. 2 and the position information of the omni-directional cameras on the plan map. Camera selection section 12 selects omni-directional camera 20 for which a captured image is used from among the plurality of omni-directional cameras 20 based on a positional relationship between the designated position on the plan map and the positions of the plurality of omni-directional cameras. Camera selection section 12 outputs information indicating selected omni-directional camera 20 to extraction parameter determining section 14.

Coordinate transformation section 13 transforms the designated position information shown in a plan map coordinate system into a camera coordinate system and outputs the transformed designated position information to extraction parameter determining section 14.

Extraction parameter determining section 14 determines an angle of view and resolution of the extracted image as extraction parameters based on the designated position on the captured image and outputs the angle of view and resolution to omni-directional camera 20. Extraction parameter determining section 14 functions as an extraction region determining section that determines an extraction image region to be extracted from the image captured by the omni-directional camera selected by camera selection section 12.

Drawing section 15 generates a display image which is the extracted image arranged on the plan map and outputs this display image to monitor 30. Drawing section 15 draws a flow line showing a moving locus of, for example, a person on the plan map based on the information inputted from omni-directional camera 20.

Next, the configuration of omni-directional camera 20 will be described. In FIG. 1, the configuration of an optical system or the like of the omni-directional camera is omitted.

Omni-directional camera 20 inputs a captured image obtained by an omni-directional optical system (not shown) to extracted image generation section 22 and object position detection section 23 via image input section 21.

Extracted image generation section 22 extracts an image from the omni-directional image according to the angle of view and resolution based on the extraction parameters inputted from extraction parameter determining section 14. In addition, extracted image generation section 22 applies distortion correction processing to the extracted image and transmits a distortion corrected extracted image to drawing section 15 via image transmitting section 24.

Object position detection section 23 detects a specific object such as a person from the omni-directional image and outputs the detection result to metadata transmitting section 25. Metadata transmitting section 25 transmits information on a character frame that surrounds a person, information on the color of clothes worn by the person, information on the shape of the person, feature value information on the face or the like to drawing section 15 as metadata.

In the configuration in FIG. 1, although extracted image generation section 22 is provided in omni-directional camera 20, extracted image generation section 22 may be provided in display image formation apparatus 10.

Processing Example 1

Next, the processing of the present embodiment performed by the configuration in FIG. 1 will be described.

Figure 3A:
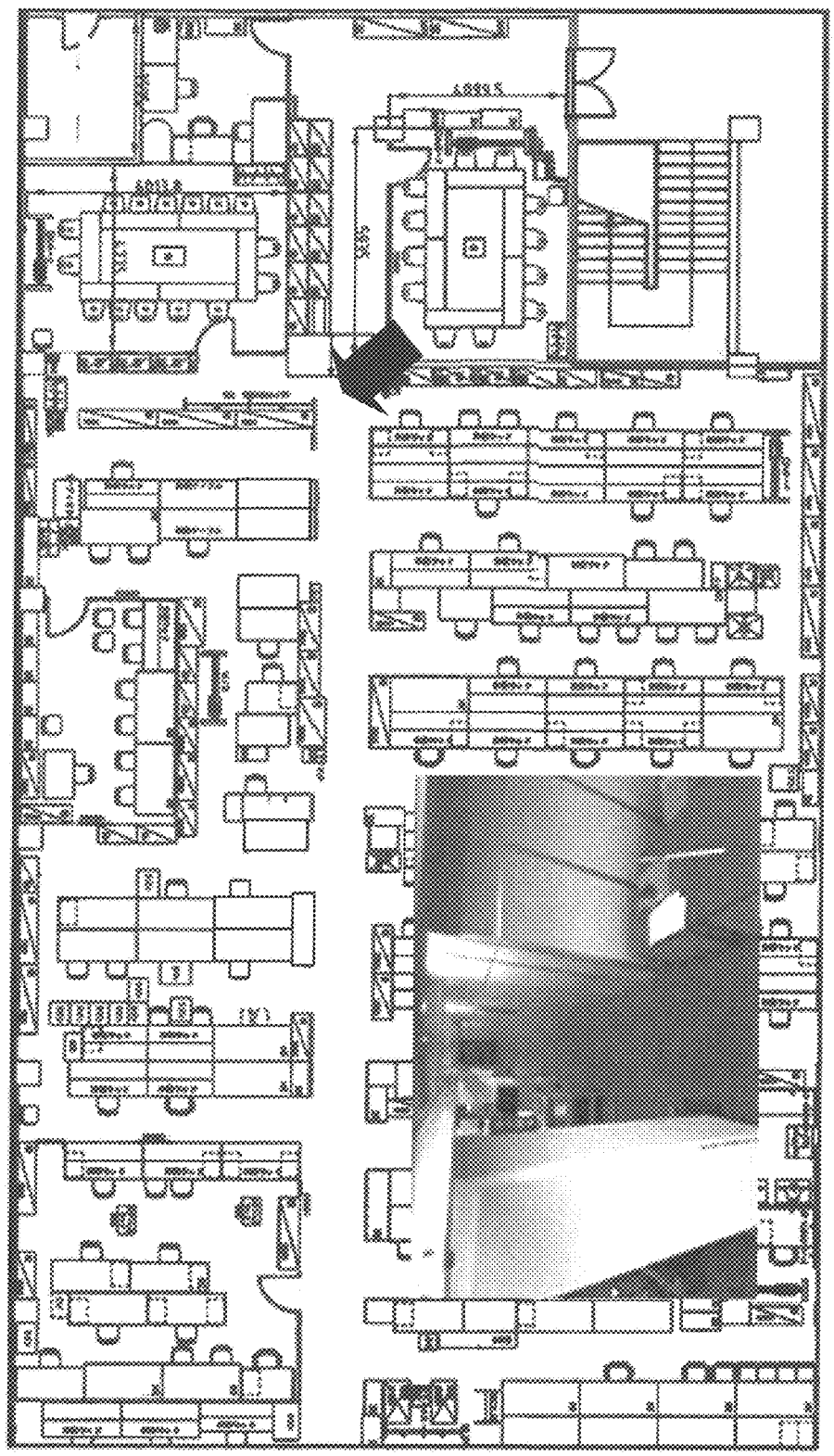

FIGS. 3A to 3E illustrate a flow of processing example 1 according to the present embodiment. Monitor 30 displays a plan map image of the office as shown in FIG. 3A and an icon for designating the display position first, and the user designates a position to be displayed while moving the icon through mouse operation or the like. Thus, since a display position (extraction position) is designated on the plan map image simulating the camera installation location, the user can intuitively designate the extraction position the user wants to see compared to the case where a display position (extraction position) is designated on an omni-directional image.

Next, camera selection section 12 of display image formation apparatus 10 calculates distance Di from a designated position on the map to the position of each camera on the map and selects an omni-directional camera in which this distance is smallest (hereinafter the omni-directional camera may be abbreviated simply as "camera"). FIG. 3B shows that camera 1 is selected because the distance to camera 1 is smaller than the distance to camera 2.

Figure 3C:
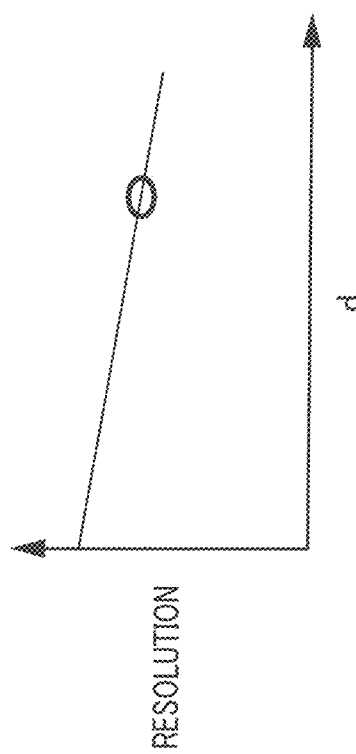

Next, extraction parameter determining section 14 of display image formation apparatus 10 determines the resolution of an image as an extraction parameter. The resolution is determined based on distance "d" indicating a distance of the designated position transformed into a camera image coordinate system by coordinate transformation section 13 from a center of the image in the camera image coordinate system. More specifically, as shown in FIG. 3C, as distance "d" from the center of the image to the designated position (the circle mark in the figure indicates the designated position) increases, the resolution is decreased. Actually, if the object is the same, an omni-directional image captured by an omni-directional camera appears greater when the designated position is closer to the center of the image and smaller when the designated position is farther from the center of the image. With this taken into account, the present embodiment increases the extraction size when the designated position is closer to the center of the image and decreases the extraction size when the designated position is farther from the center of the image. The present embodiment performs pixel interpolation or the like on an extracted image having a smaller extraction size, to thereby enlarge the image and form a display image, thus adjusting the size of the display image. As a result, the greater the distance of the designated position from the center of the image, the lower the resolution of the display image becomes. That is, the present embodiment changes the resolution of an extracted image displayed according to the distance from the center of the image captured by the omni-directional camera to the extracted image region.

Similarly, the resolution of the extracted image displayed may be decreased when a position farther from the camera is designated. That is, the resolution of the extracted image displayed may be changed according to the distance from the position at which the omni-directional camera is located to a photographing target region corresponding to the extracted image region. In addition, for a region in which an object of interest such as a person is reflected, the resolution of the extracted image displayed may be increased.

Figure 3D:
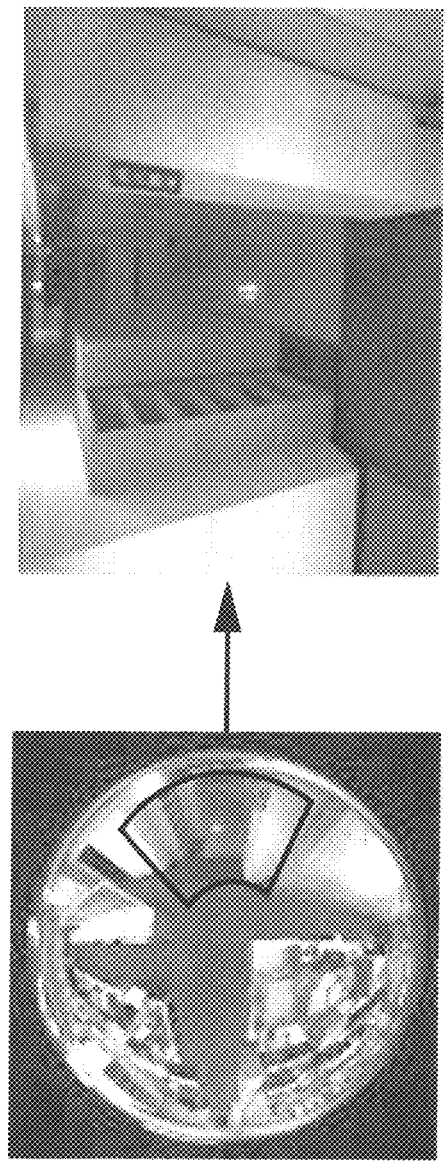

Extracted image generation section 22 of camera 1 (omni-directional camera 20) extracts an image of a region corresponding to the designated position of the omni-directional image in a size corresponding to the distance from the center of the image as shown in FIG. 3D, applies distortion correction or pixel interpolation thereto and thereby generates a distortion corrected image at the resolution corresponding to the distance from the center of the image.

Figure 3E:
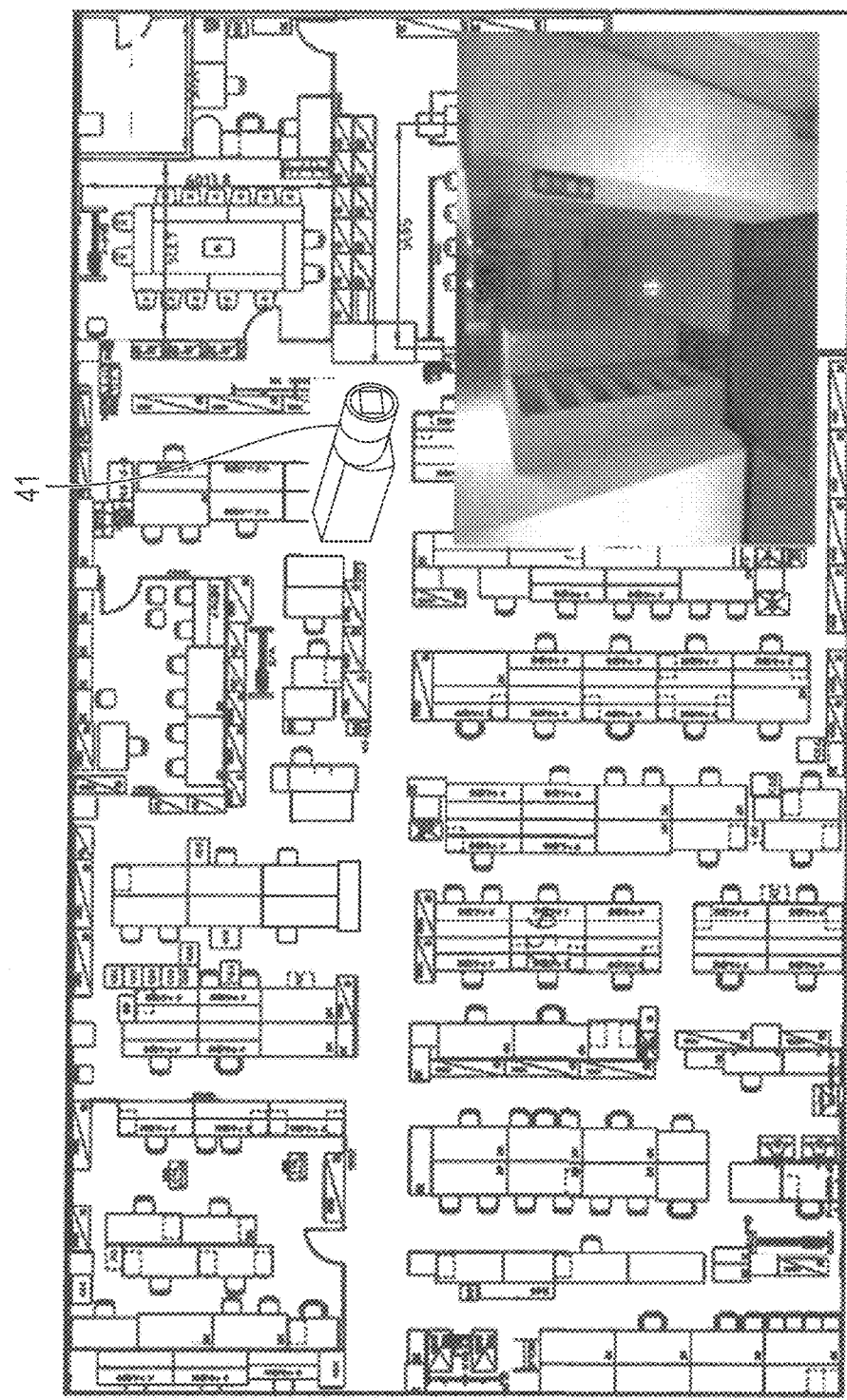

Next, drawing section 15 of display image formation apparatus 10 forms an image including the distortion corrected image and camera icon 41 arranged on the plan map as shown in FIG. 3E and displays this image on monitor 30.

Processing Example 2

Figure 4A:
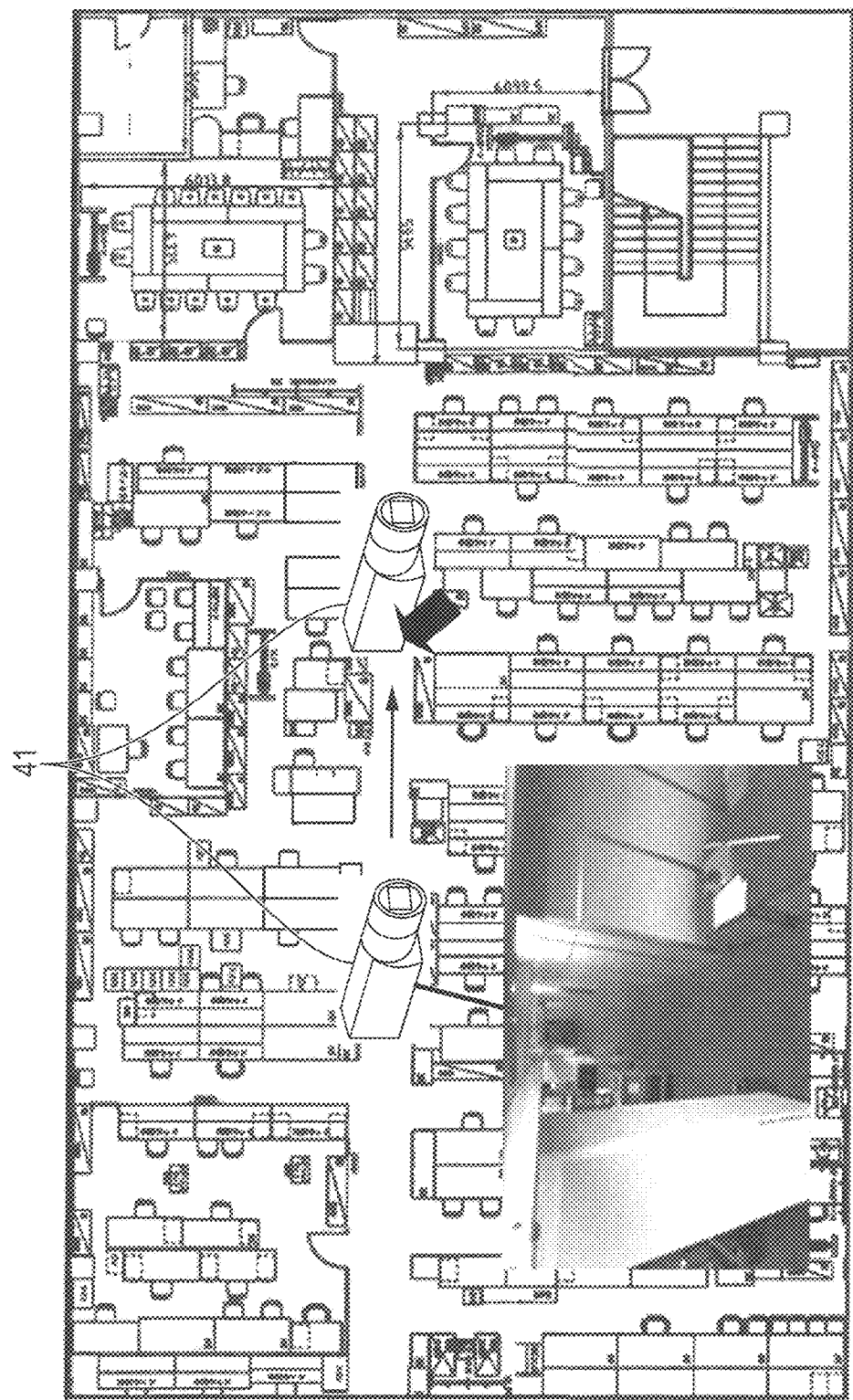
FIGS. 4A to 4E illustrate a flow of processing example 2.

FIGS. 4A to 4E illustrate a flow of processing example 2 of the present embodiment. Monitor 30 displays a plan map image of the office and camera icon 41 for designating the display position as shown in FIG. 4A first, and the user designates a position to be displayed through mouse operation or the like while dragging camera icon 41. Note that camera icons 41 shown in FIG. 4A and FIG. 4E do not illustrate positions at which the cameras are installed but positions at which images are extracted.

Figure 4B:
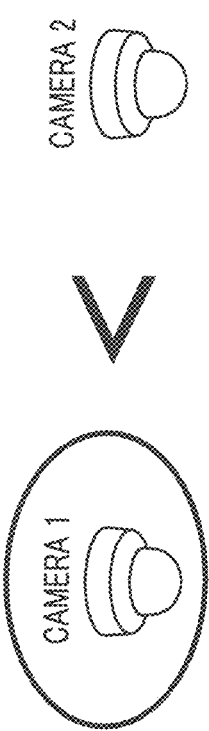

Next, camera selection section 12 of display image formation apparatus 10 calculates distance Di from the dragging position on the map to the position of each camera on the map and selects a camera in which this distance is smallest. FIG. 4B shows that camera 1 is selected because the distance to camera 1 is smaller than the distance to camera 2.

However, while dragging is in progress, camera selection section 12 prevents the camera from being switched to another camera even if the camera is in a switching position. That is, although the distance to camera 2 is smaller than the distance to camera 1 at the start position of dragging and the distance to camera 2 becomes smaller than the distance to camera 1 in the middle of the dragging, camera 2 is not switched to camera 1 in the middle of the dragging.

Figure 4C:
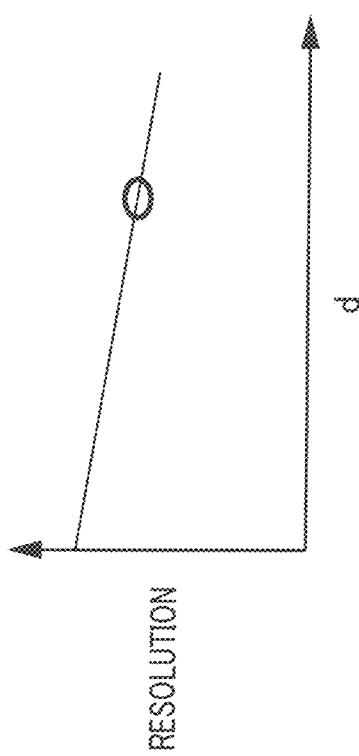
Figure 4D:
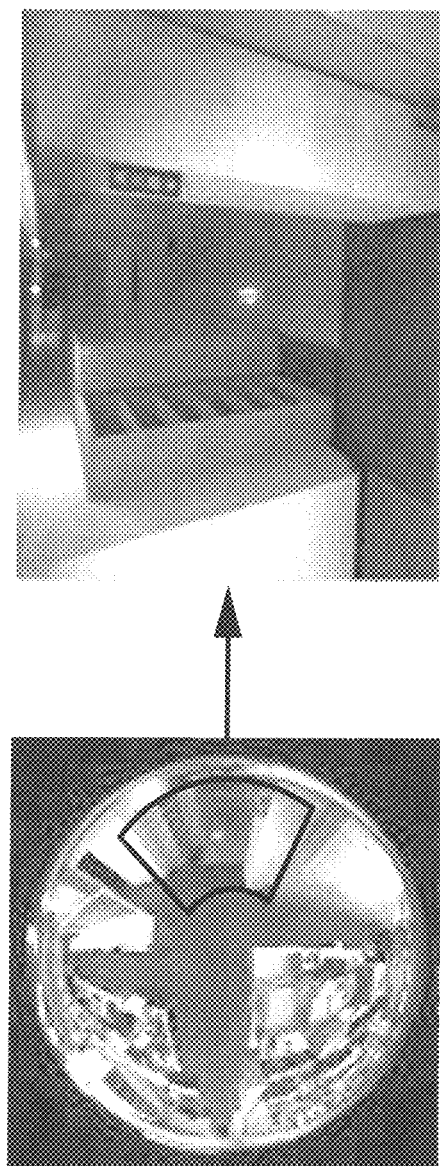

Next, as shown in FIG. 4C, extraction parameter determining section 14 of display image formation apparatus 10 determines the resolution based on distance "d" from the center of the image to the designated position. Next, extracted image generation section 22 of camera 1 (omni-directional camera 20) extracts an image of a region corresponding to the designated position of the omni-directional image at the determined resolution as shown in FIG. 4D, applies distortion correction thereto and thereby generates a distortion corrected image.

Figure 4E:
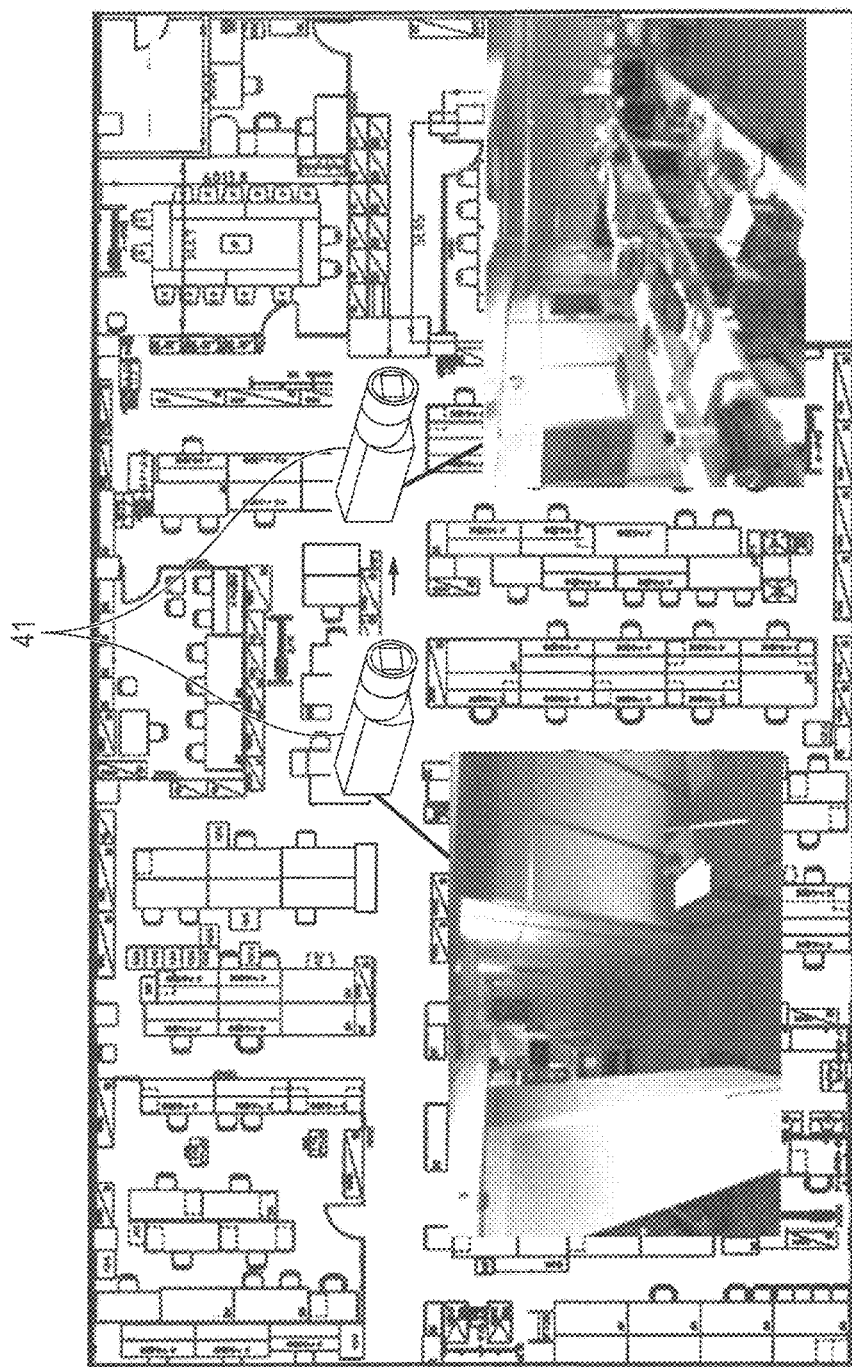

Next, drawing section 15 of display image formation apparatus 10 forms an image including the distortion corrected image and camera icons 41 arranged on the plan map as shown in FIG. 4E and displays this image on monitor 30.

Here, since the camera is not switched to another one while the dragging is in progress but switched after completing the dragging, the point of view need not be changed in the middle of the dragging, and it is possible to display an image with less uncomfortable feeling to the user.

By the way, while the dragging is in progress, the image of the camera selected at the start of the dragging and the extracted image corresponding to the dragging position are displayed.

A case has been described in this example where a display position is designated by dragging camera icon 41, but this designation method is not limited to dragging. For example, only a start point and an end point may be designated.

Processing Example 3

Figure 5A:
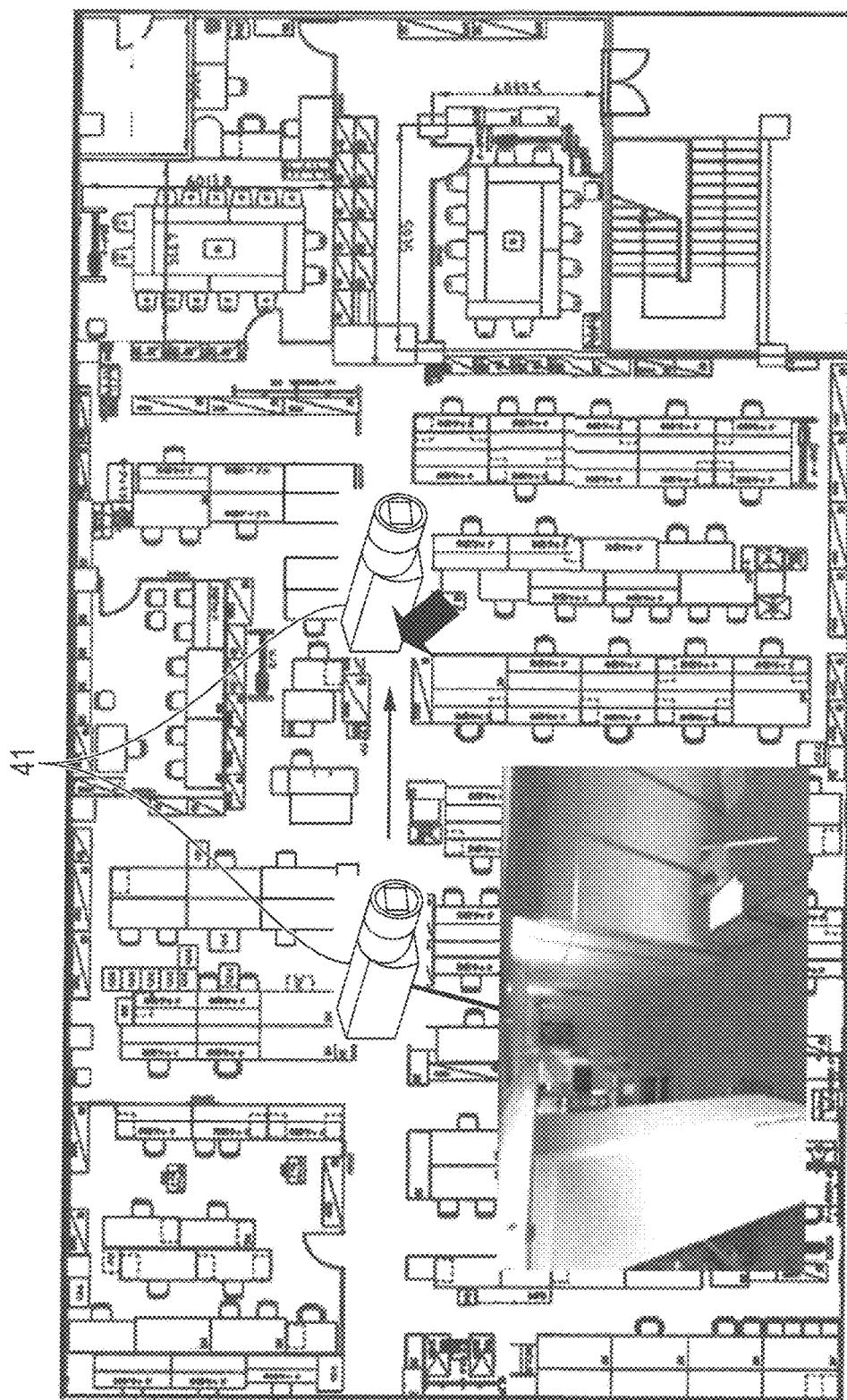
FIGS. 5A to 5E illustrate a flow of processing example 3.

FIGS. 5A to 5E illustrate a flow of processing example 3 of the present embodiment. Monitor 30 displays a plan map image of the office and camera icon 41 for designating a display position as shown in FIG. 5A first, and the user designates a position to be displayed through mouse operation or the like while dragging camera icons 41. Note that camera icons 41 shown in FIG. 5A and FIG. 5E do not illustrate the positions at which the cameras are installed, but illustrate positions at which images are extracted.

Figure 5B:
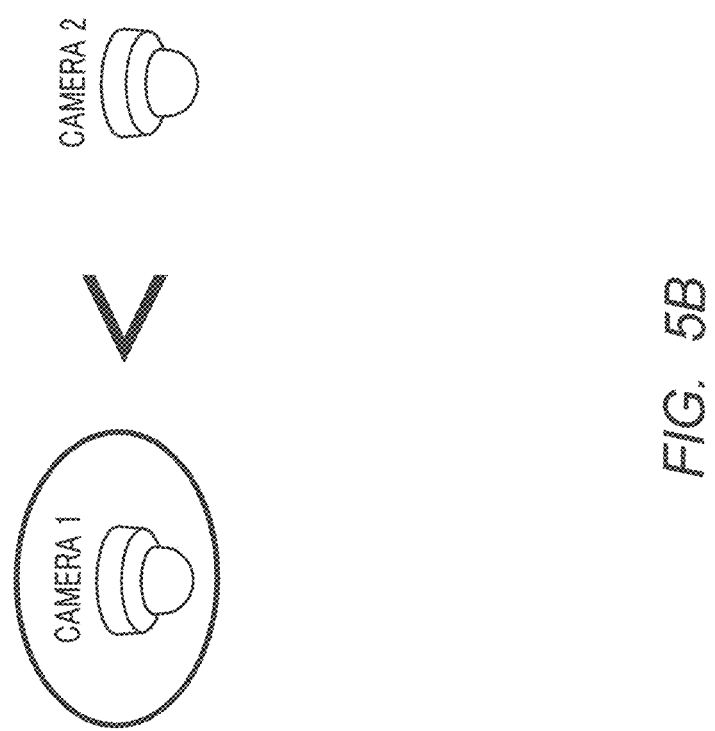

Next, camera selection section 12 of display image formation apparatus 10 calculates distance Di from the dragging position on the map to the position of each camera on the map and selects a camera in which this distance is smallest. FIG. 5B shows that camera 1 is selected because the distance to camera 1 is smaller than the distance to camera 2.

Figure 5C:
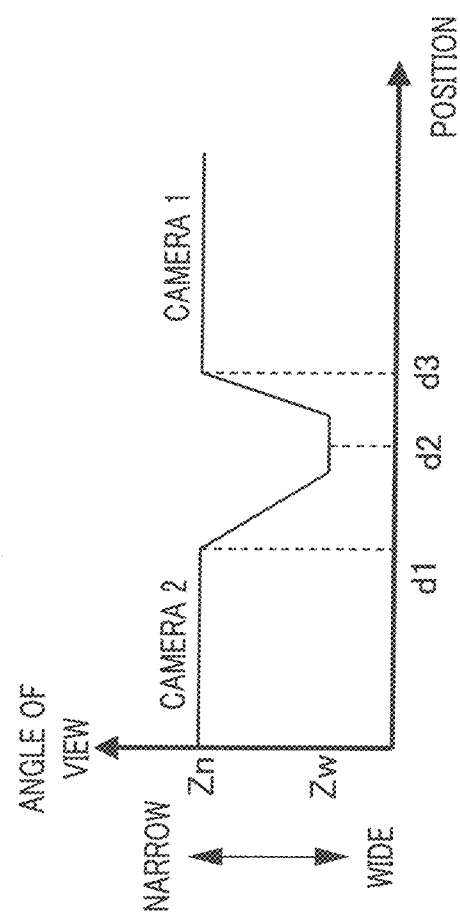
Figure 5D:
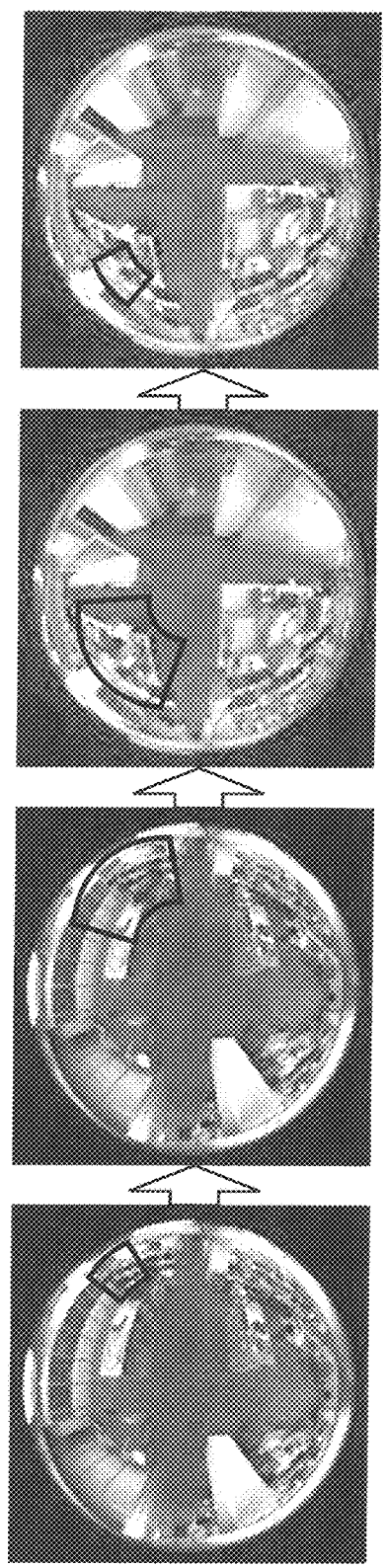

Next, extraction parameter determining section 14 of display image formation apparatus 10 determines an angle of view of the camera as an extraction parameter. The angle of view is determined such that the angle of view of the extracted region becomes a wide angle before and after switching between the cameras. More specifically, as shown in FIG. 5C, the angle of view is gradually changed to a wide-angle (Zw) position from a position (d1) at a predetermined distance from the camera switching point. After passing through the camera switching position (d2), the angle of view is gradually returned to the original angle of view (Zn) to a position (d3) at a predetermined distance. FIG. 5D illustrates how the angle of view of the extracted image changes.

Next, extracted image generation section 22 of camera 1 (omni-directional camera 20) extracts an image of a region corresponding to the designated position of the omni-directional image of the selected camera at the determined angle of view, applies distortion correction thereto and thereby generates a distortion corrected image.

Figure 5E:
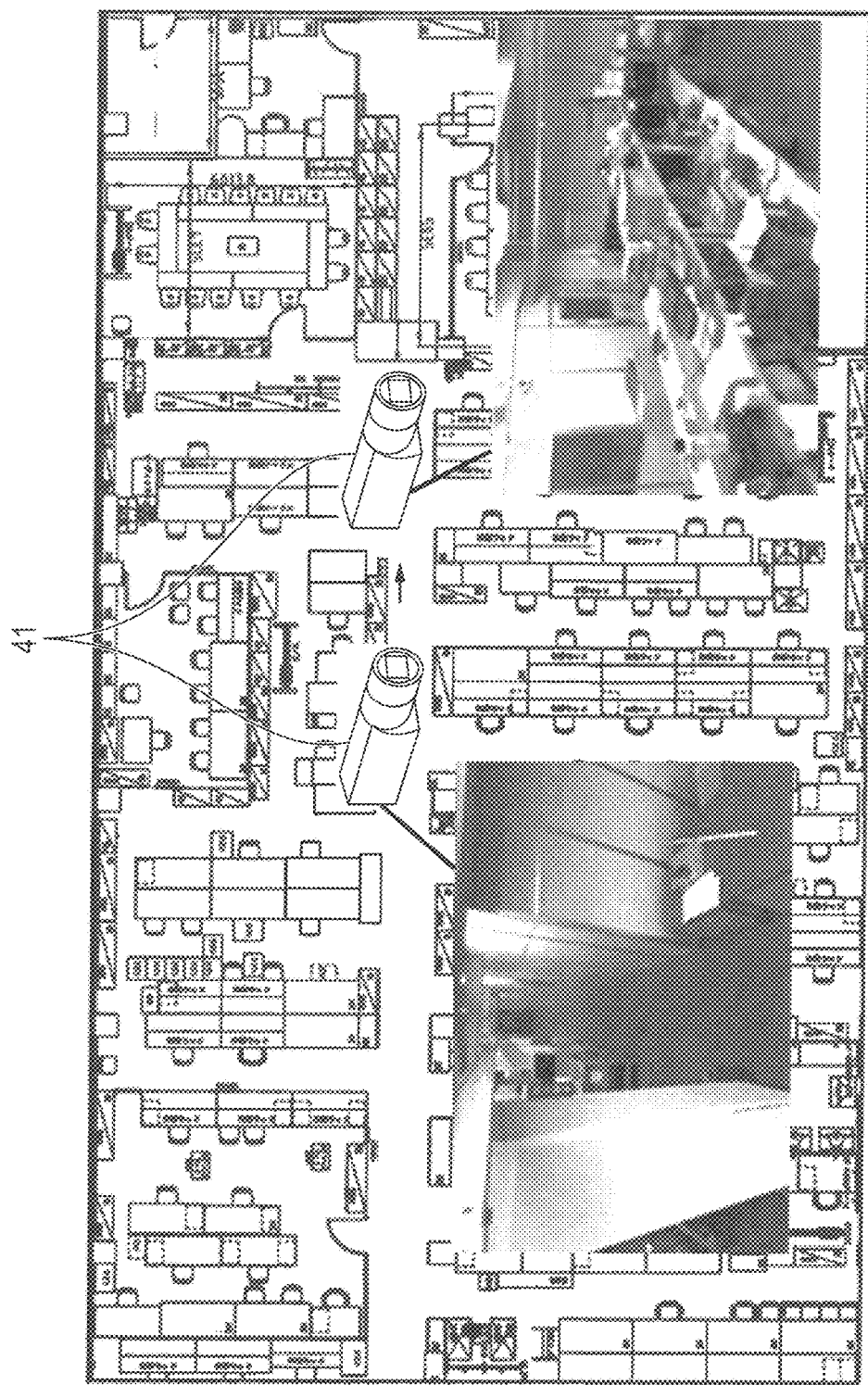
Figure 6A:
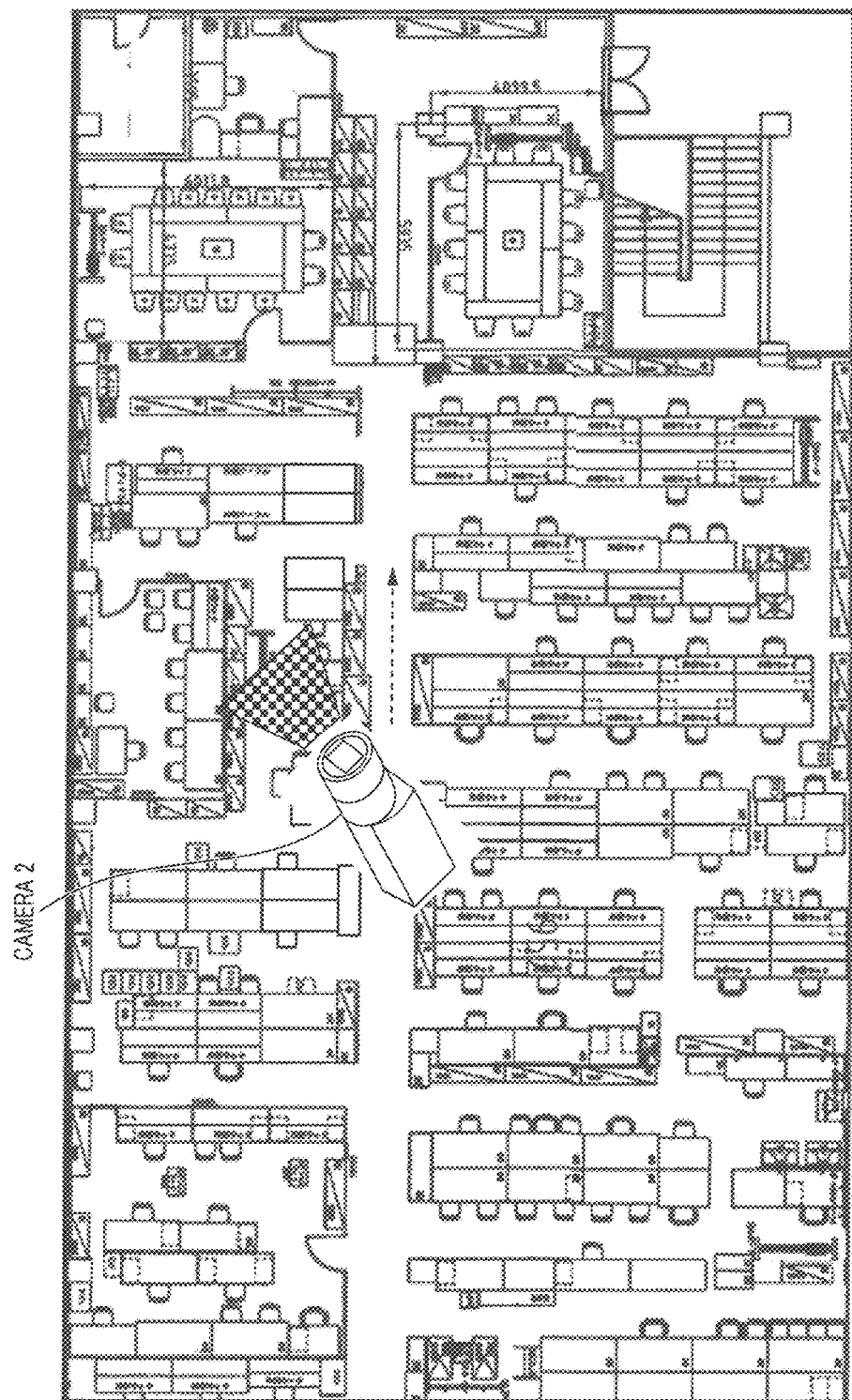
FIGS. 6A to 6D illustrate, on a plan map, which ranges of images are displayed on a monitor when an angle of view is controlled.
Figure 6B:
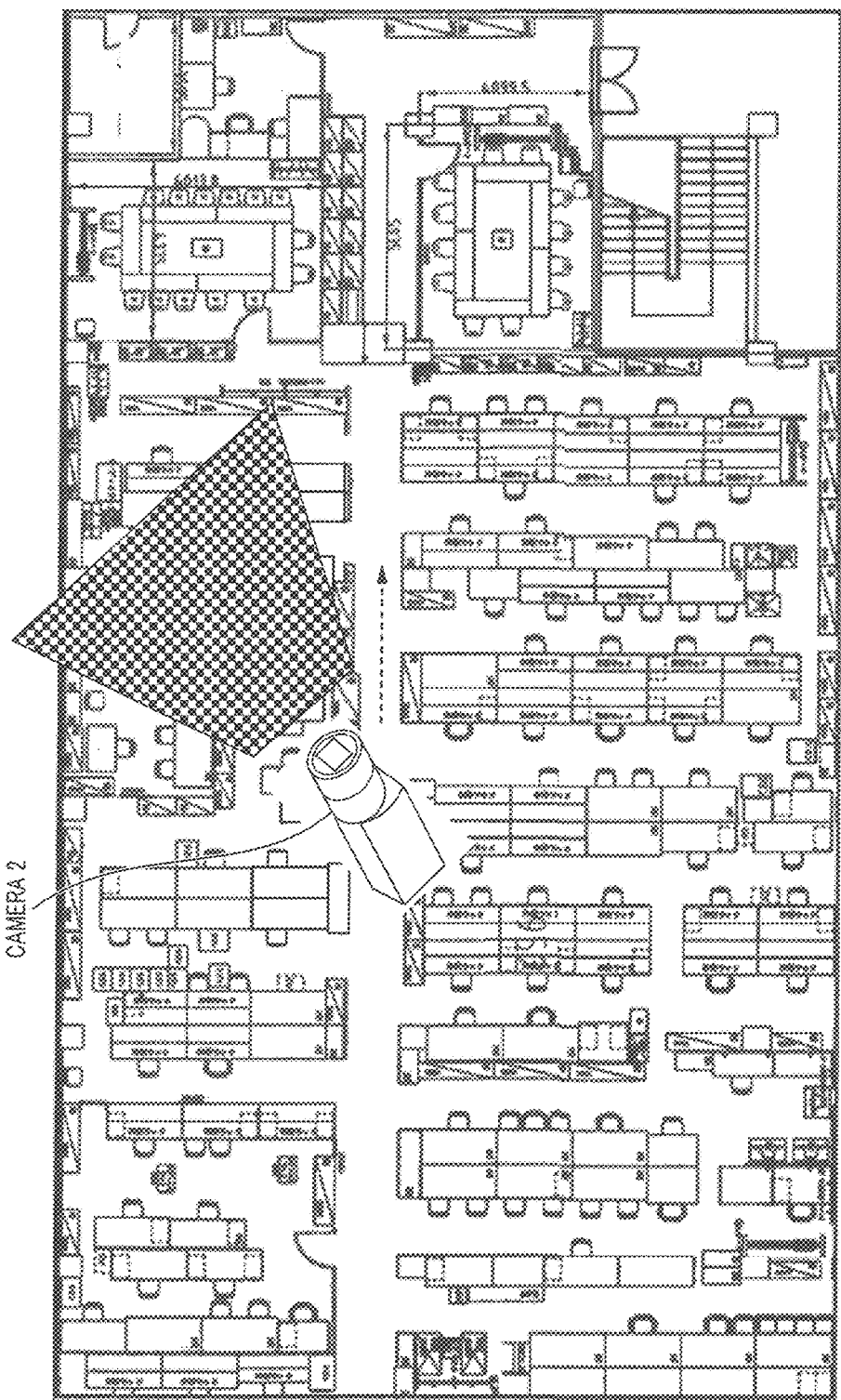
Figure 6C:
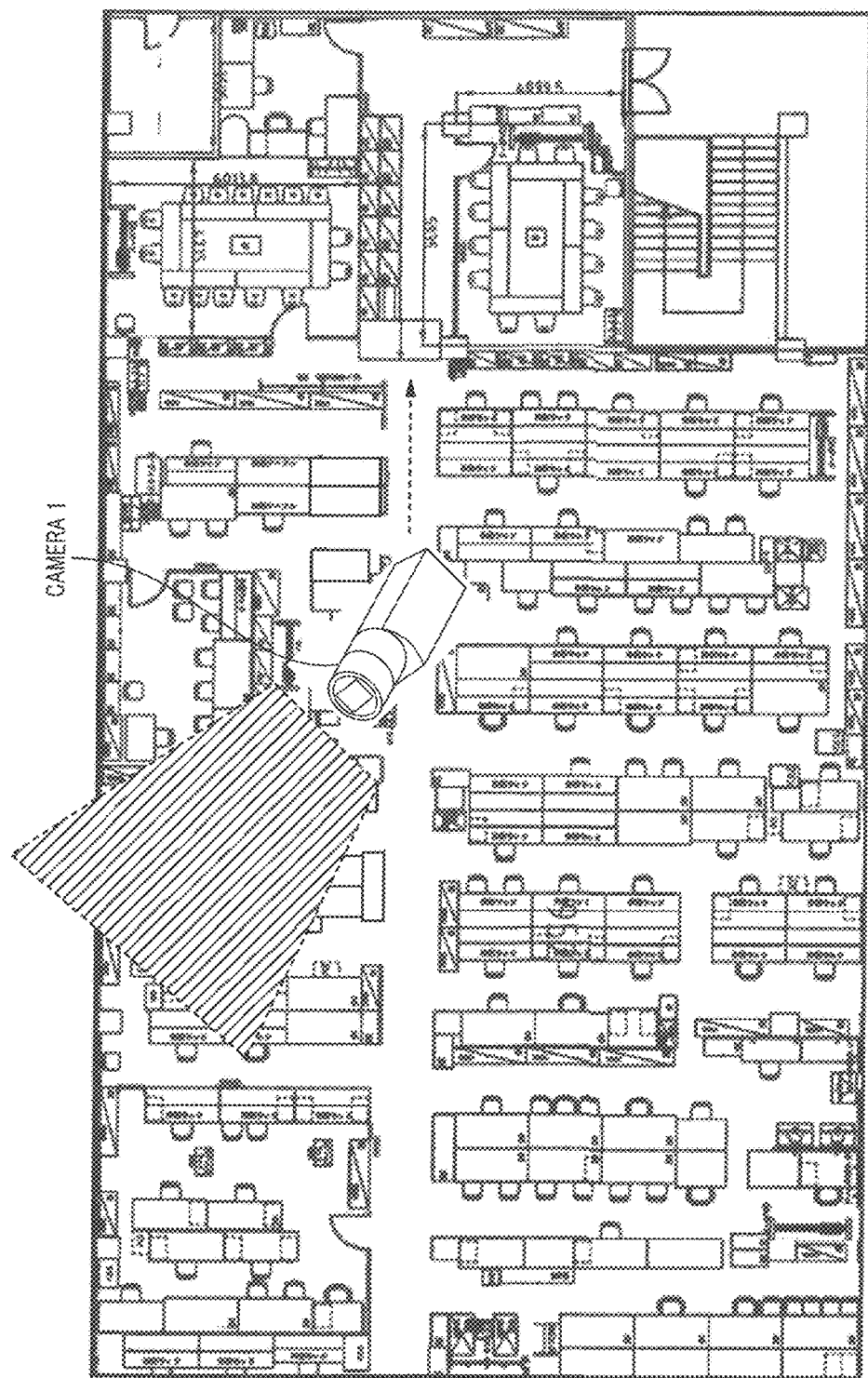
Figure 6D:
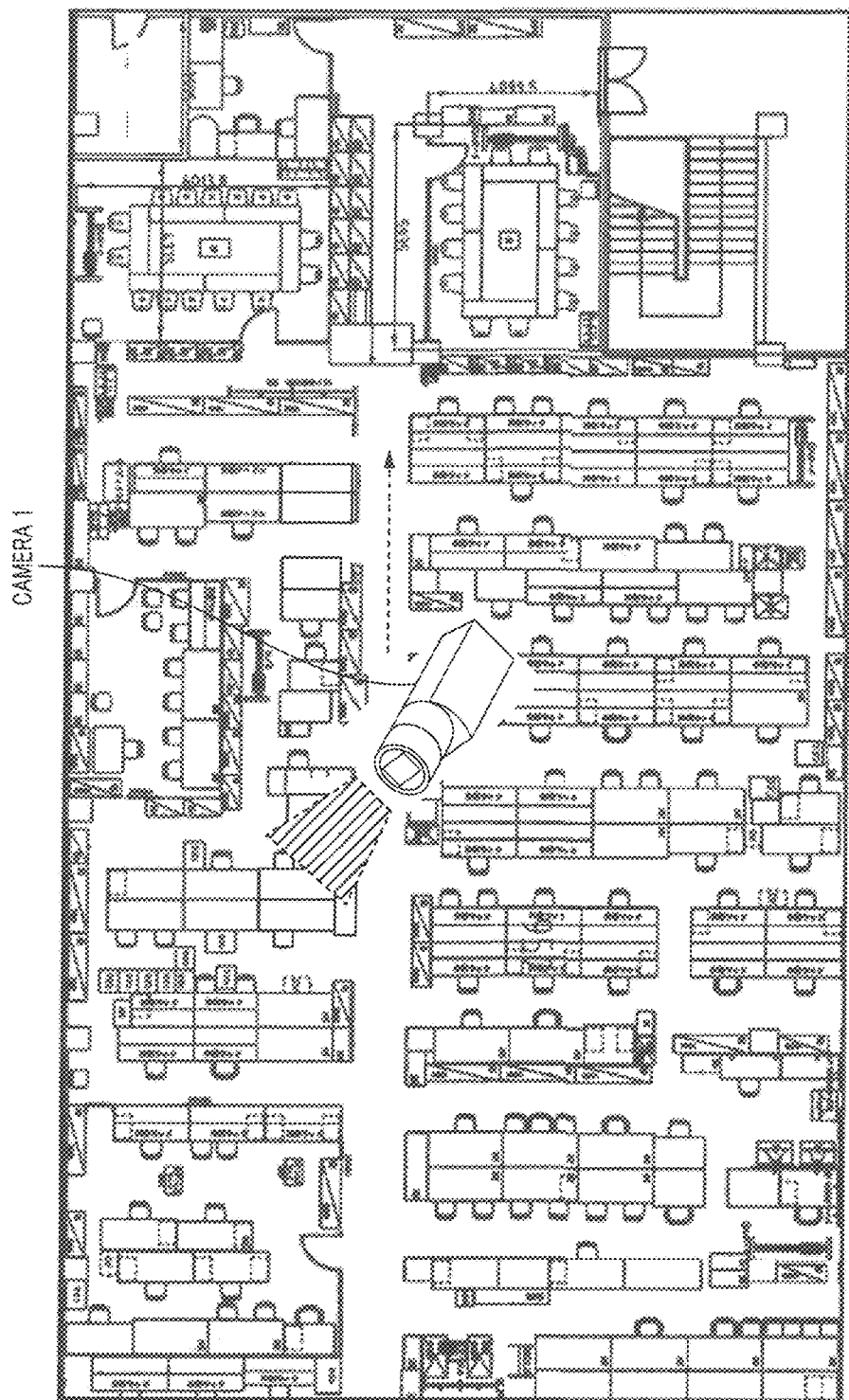

Next, drawing section 15 of display image formation apparatus 10 forms an image including the distortion corrected image and camera icons 41 arranged on the plan map and displays this image on monitor 30 as shown in FIG. 5E.

Here, as shown in FIG. 5C and FIG. 5D, since the angle of view of the extraction region is changed to a wide angle before and after the camera switching, in other words, the camera is switched after changing the angle of view to a wide angle, this increases the probability that a common object may be displayed when the camera is switched, which allows the user to more easily grasp the positional relationship between the images even when the camera is switched.

FIGS. 6A to 6D show, on the plan map, which range of the image is actually displayed on monitor 30 when the angle of view is controlled as shown in FIG. 5C and FIG. 5D. Here, an image indicating, on the plan map, a display range (range of field of view) as shown in FIGS. 6A to 6D may be displayed on monitor 30 simultaneously with the extracted image. This allows the user to more easily recognize the positional relationship between the images when the camera is switched.

A preferable way of changing the angle of view when the camera is switched is to search a common object between the cameras and set, when the common object exists, an angle of view such that the object falls within the angle of view. By so doing, the common object appears when the camera is switched, which allows the user to more easily recognize which place is shown even when the camera is switched, enabling natural camera switching. The "common object" is preferably an object such as a pillar or window easy to be used by the user as a reference.

Processing Example 4

This processing example presents a method that allows the user to easily designate and display an image the user wants to see using a camera icon.

(1) Designation of Direction

The direction of the camera is designated using a procedure shown in FIGS. 7A to 7D. Here, the direction of the camera means the direction of a sight line.

FIGS. 7A to 7D illustrate an image displayed on monitor 30 and the user designates the direction of the camera while viewing the display image as shown in FIGS. 7A to 7D. That is, the user designates from which direction the user wants to view the designated position.

Figure 7A:
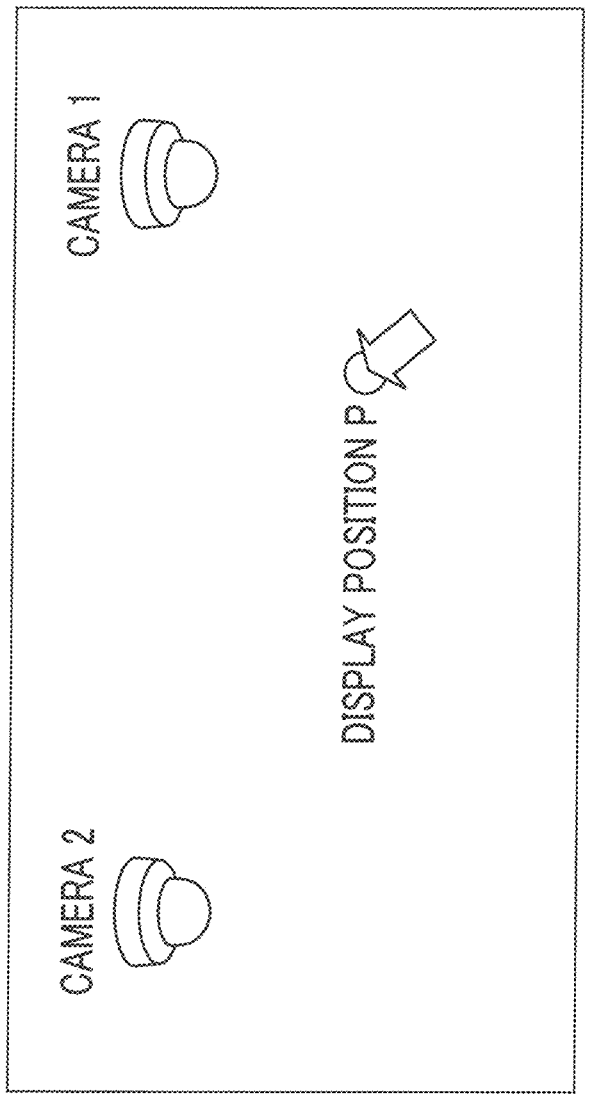
FIGS. 7A to 7D illustrate a flow of processing example 4.

First, as shown in FIG. 7A, the user designates display position P.

Figure 7B:
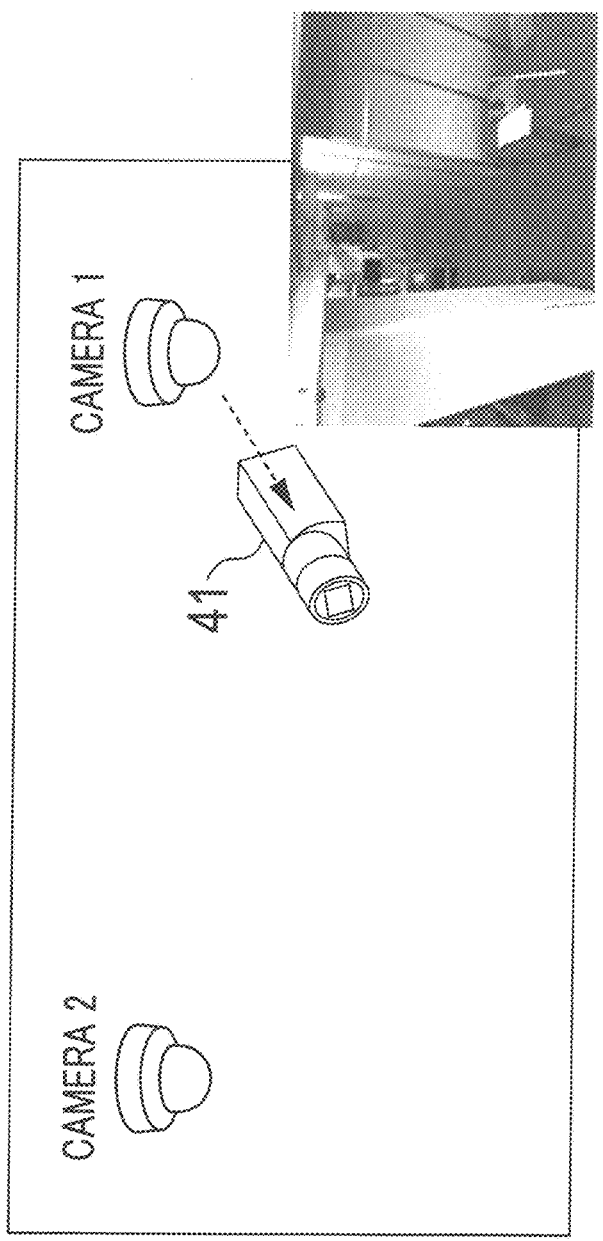

Next, display image formation apparatus 10 sets the direction of a straight line that connects position Pc1 of camera 1 closest and designated display position P and display position P as shown in FIG. 7B as the direction of the camera and displays camera icon 41 turned to the direction. The display position of camera icon 41 is set such that designated display position P becomes the center of the icon. Such processing may be performed by camera selection section 12 and drawing section 15. The user can recognize the direction from which the current extracted image is seen based on the direction of camera icon 41 shown in FIG. 7B.

Figure 7C:
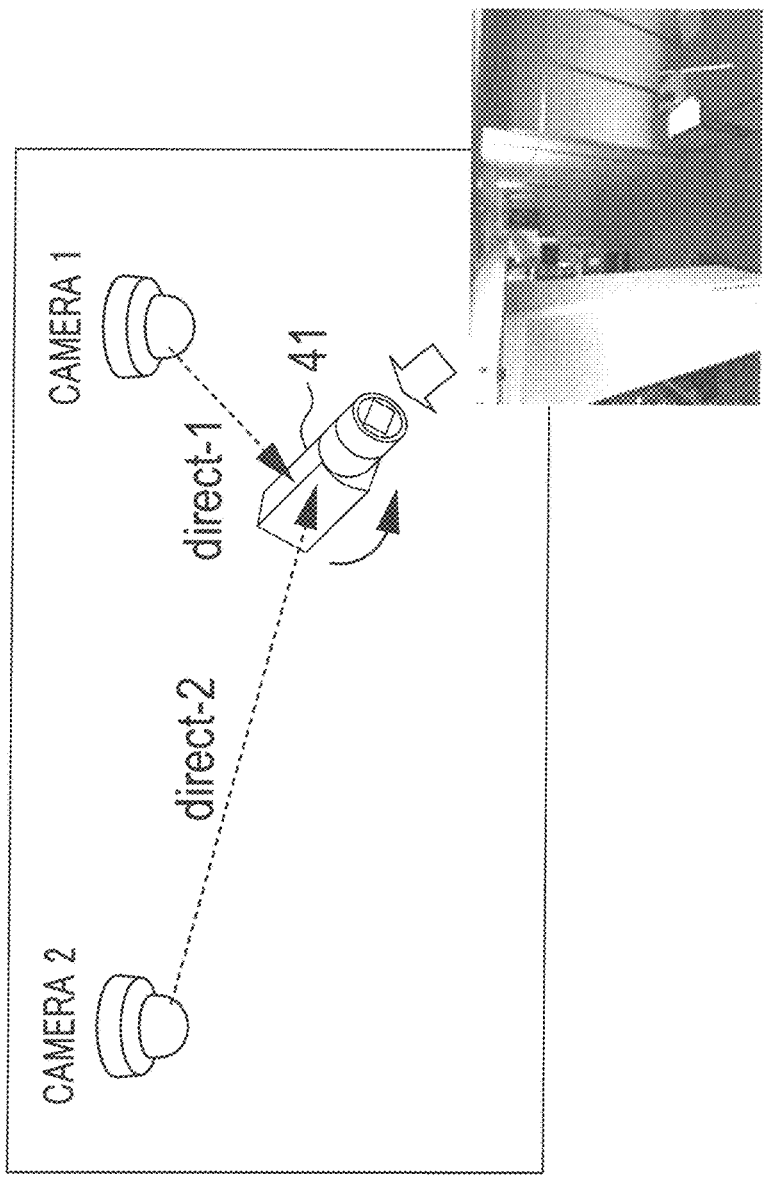

Next, as shown in FIG. 7C, the user drags an end of camera icon 41 to turn camera icon 41 to the direction from which the user wants to see the image.

Then, display image formation apparatus 10 determines camera direction candidates direct-1 and direct-2 from each camera position Pc1, Pc2 and display position P as shown in FIG. 7C, and selects a camera at an angle closest to the direction from which the user wants to see the above image operated by the user (that is, the direction toward which camera icon 41 in FIG. 7C is oriented) (direct-2, that is, camera 2 in the example in FIG. 7C). Such processing may be performed by camera selection section 12.

Figure 7D:
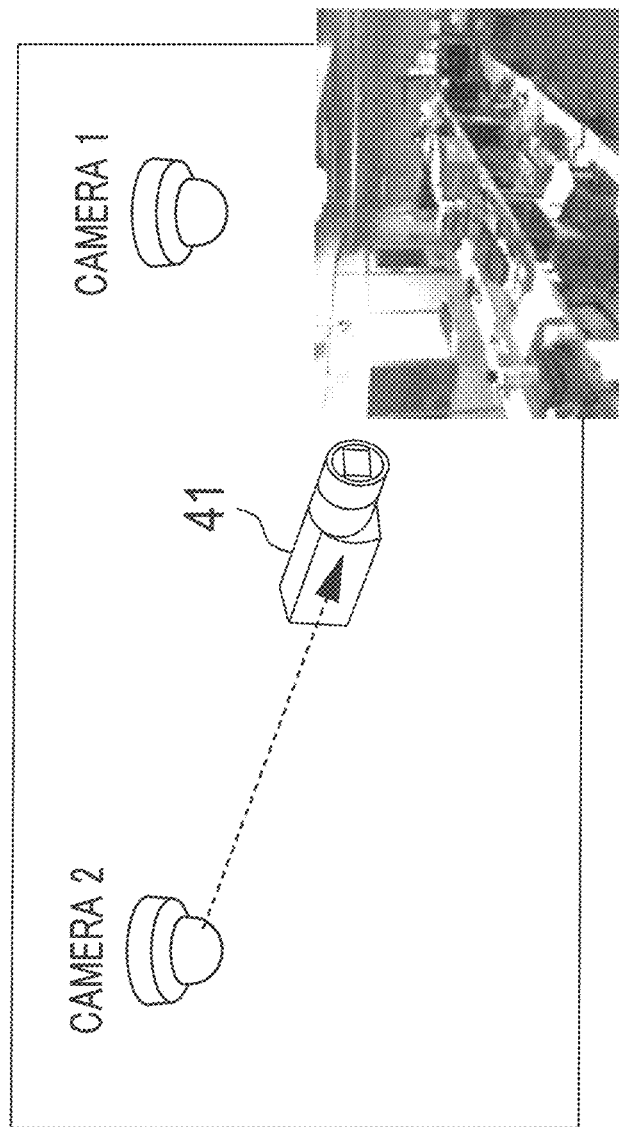

As shown in FIG. 7D, display image formation apparatus 10 displays the image of a camera corresponding to a direction candidate (camera 2 in the embodiment) and also changes the orientation of camera icon 41 to the sight line direction of camera 2. This processing may be performed by camera selection section 12 and drawing section 15.

(2) Designation of Angle of View 1

The angle of view of a display image is designated using a procedure shown in FIGS. 8A to 8D. Here, the angle of view and zoom magnification have a one-to-one relationship, and a large angle of view means a small zoom magnification. Moreover, the angle of view may be paraphrased as a viewing angle of an image displayed.

Figure 8A:
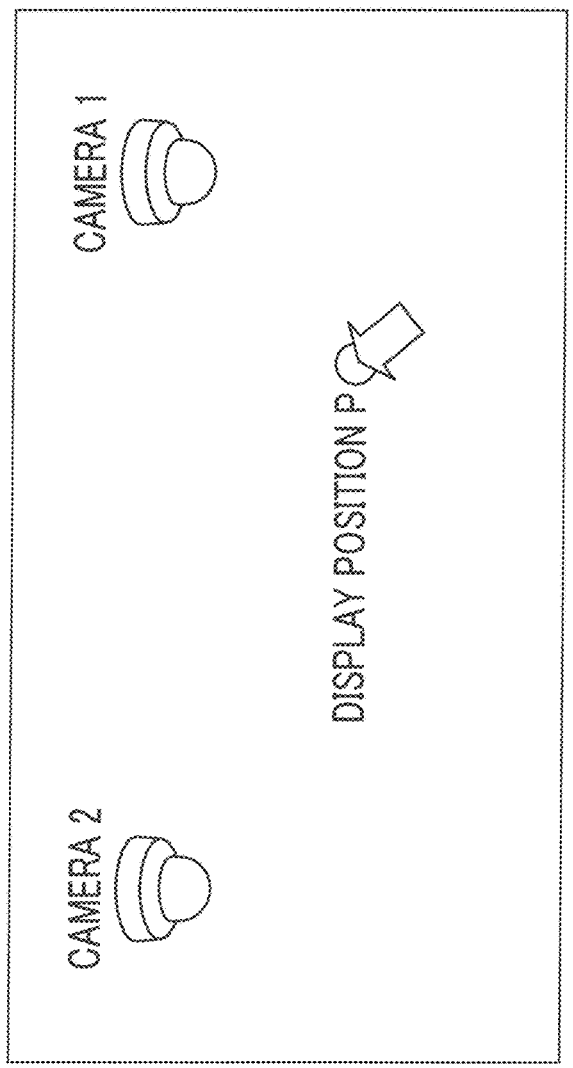
FIGS. 8A to 8D illustrate a flow of processing example 4.
Figure 8B:
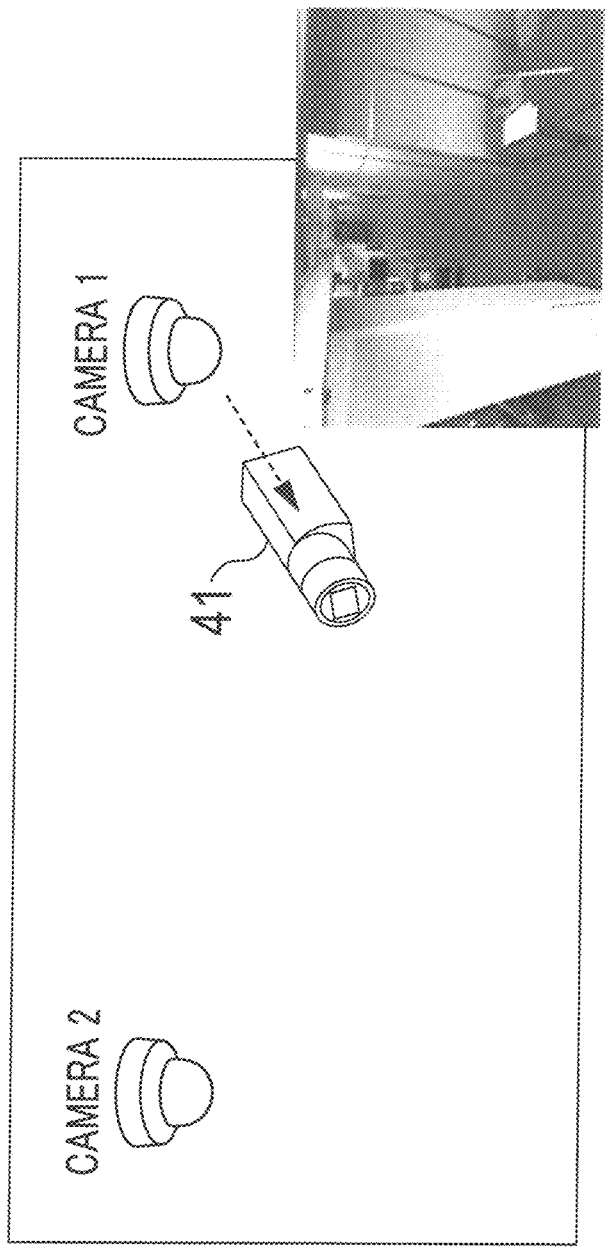

The procedure in FIG. 8A and FIG. 8B is similar to the procedure described in FIG. 7A and FIG. 7B. That is, as shown in FIG. 8A, the user designates display position P first. Next, display image formation apparatus 10 sets the orientation of a straight line connecting position Pc1 of camera 1 closest to designated display position P and display position P as the direction of the camera as shown in FIG. 8B, and displays camera icon 41 turned to that direction.

Figure 8C:
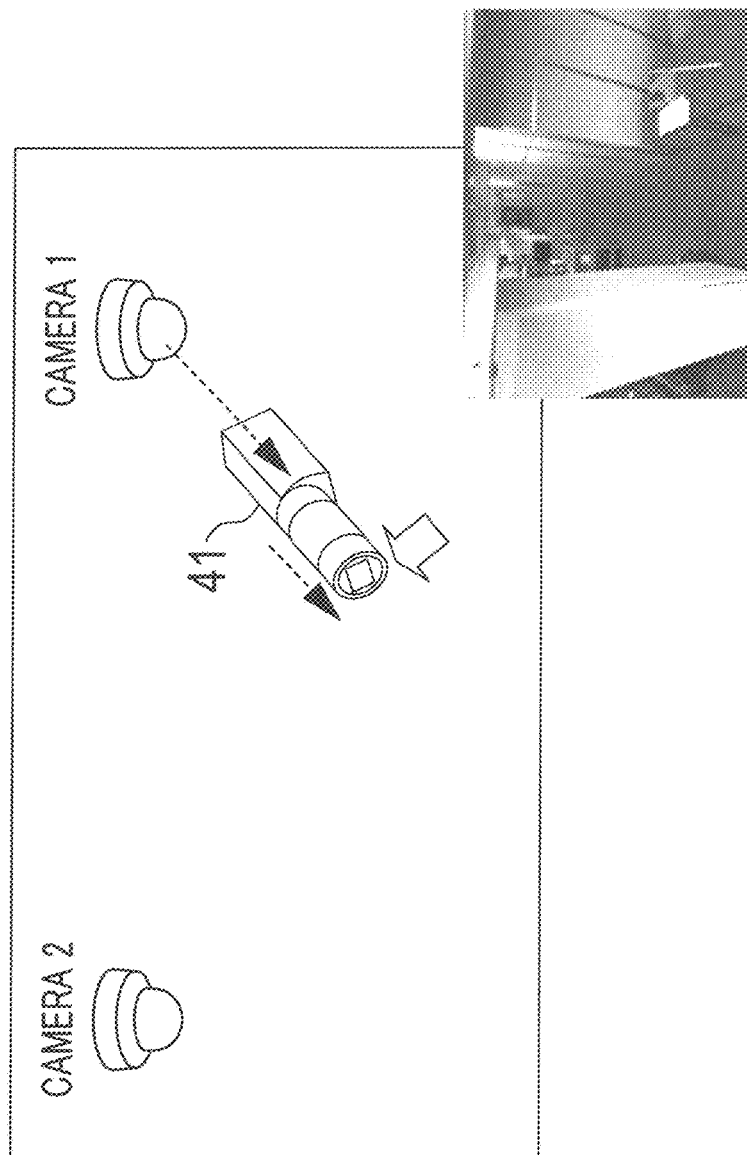
Figure 8D:
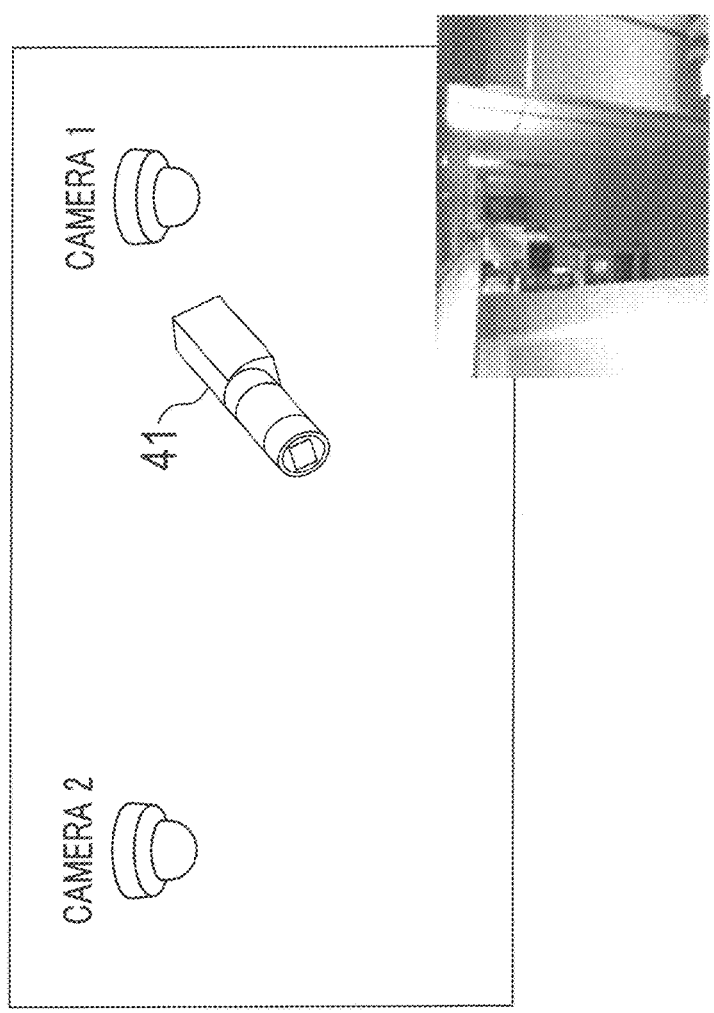

Next, as shown in FIG. 8C, when the user drags the lens part of camera icon 41, the lens part extends.

The extent to which the angle of view is increased or decreased is set in advance in display image formation apparatus 10 according to the expansion/contraction of the lens part of camera icon 41, and display image formation apparatus 10 adjusts the angle of view based on the degree of expansion/contraction of the lens part operated by the user and displays the image. Such processing can be performed by extraction parameter determining section 14.

(3) Designation of Angle of View 2

FIGS. 9A to 9D illustrate a second example of the angle of view designation method.

Figure 9A:
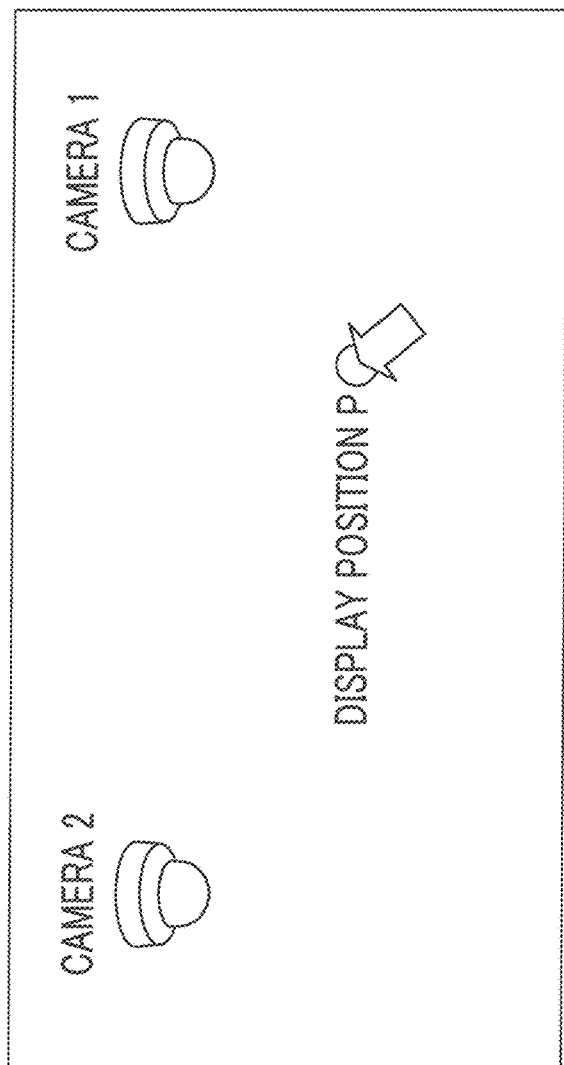
FIGS. 9A to 9D illustrate a flow of processing example 4.
Figure 9B:
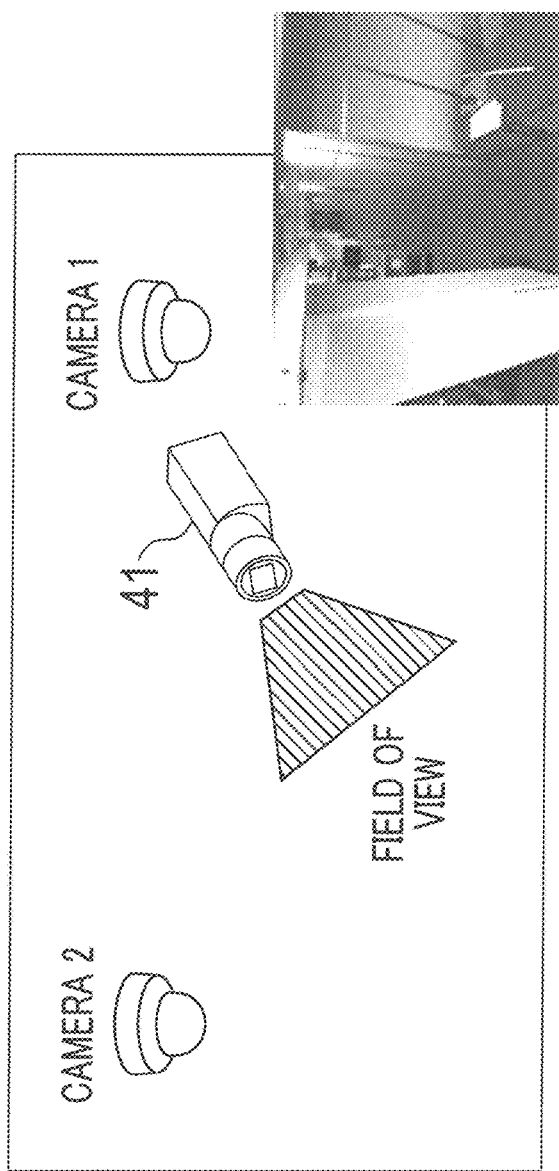

First, the user designates display position P as shown in FIG. 9A. Next, display image formation apparatus 10 sets the orientation of a straight line connecting position Pc1 of camera 1 closest to designated display position P and display position P as the direction of the camera as shown in FIG. 9B and displays camera icon 41 turned to that direction.

The field of view calculated from the default angle of view is displayed. The display position of this field of view is set such that designated display position P becomes the center of the field of view. The display position of camera icon 41 may also be set such that designated display position P becomes the center of camera icon 41. Such a field of view can be displayed by cooperation among camera selection section 12, extraction parameter determining section 14 and drawing section 15.

Figure 9C:
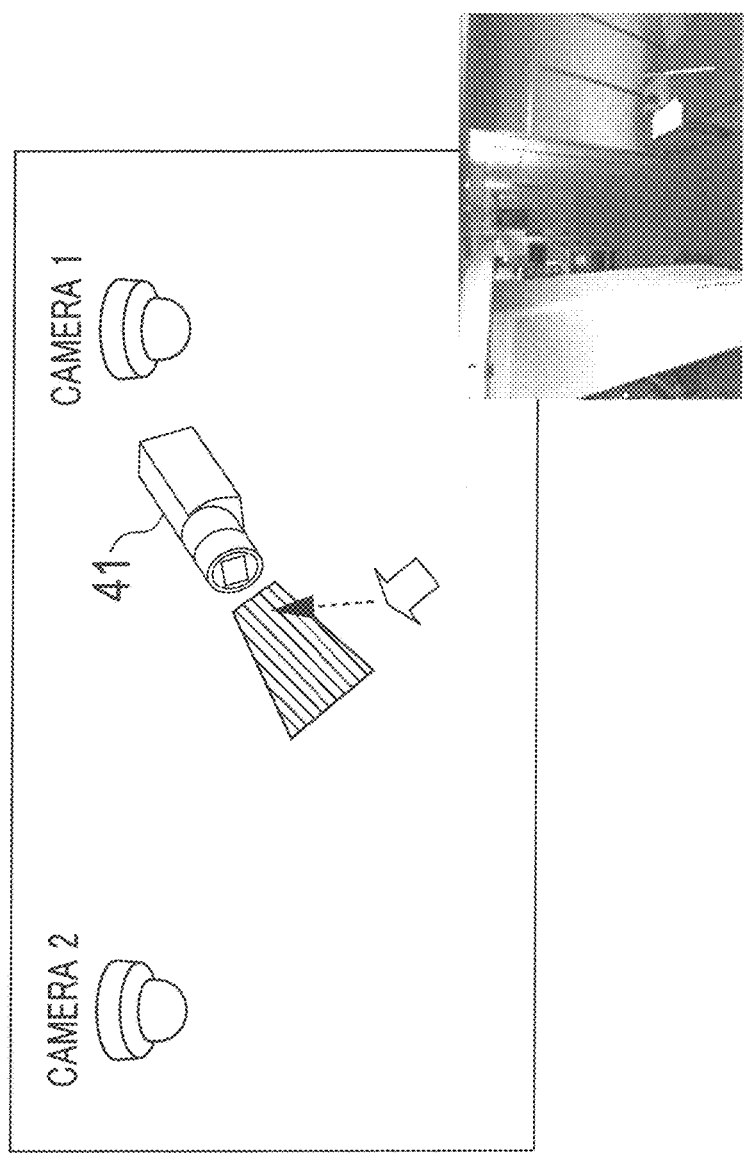

Next, as shown in FIG. 9C, when the user drags an end of the field of view, the field of view is changed to one corresponding to an image the user wants to see.

Figure 9D:
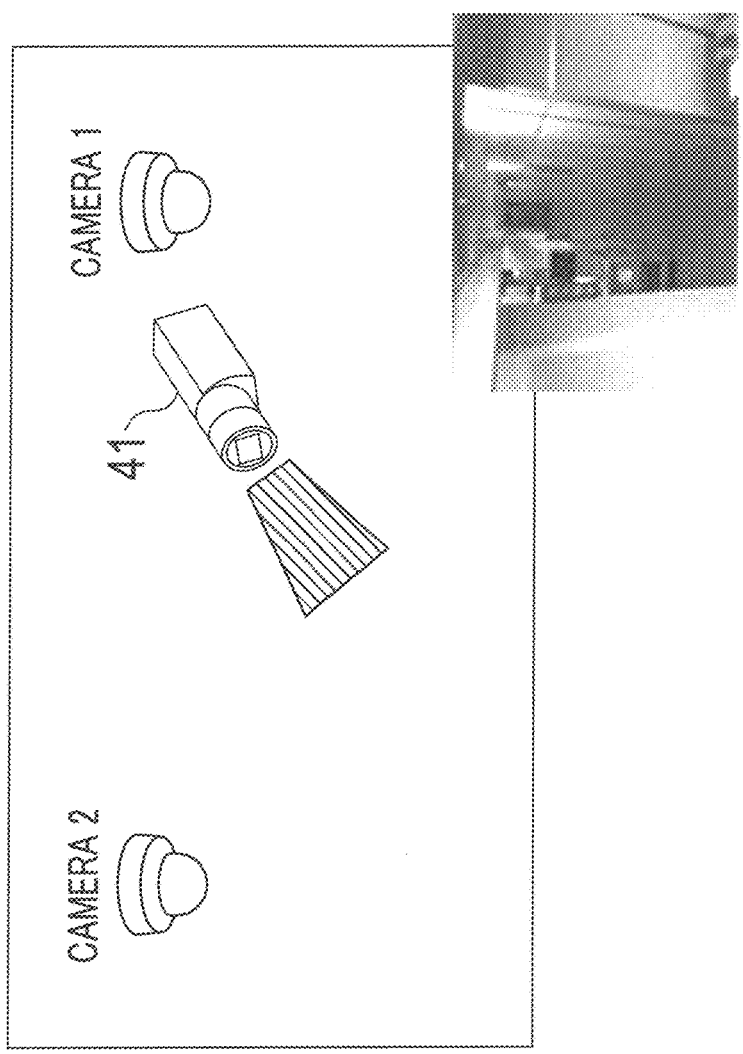

Then, display image formation apparatus 10 displays an image at the designated angle of view (field of view) as shown in FIG. 9D. Such processing can be performed by extraction parameter determining section 14.

As in this example, the user can more intuitively designate the angle of view by displaying the field of view of the extracted image on the plan map on the same screen as the extracted image determined by extraction parameter determining section 14.

(4) Designation of Time

The time that corresponds to an image to be displayed is designated using a procedure shown in FIGS. 10A to 10D.

Figure 10A:
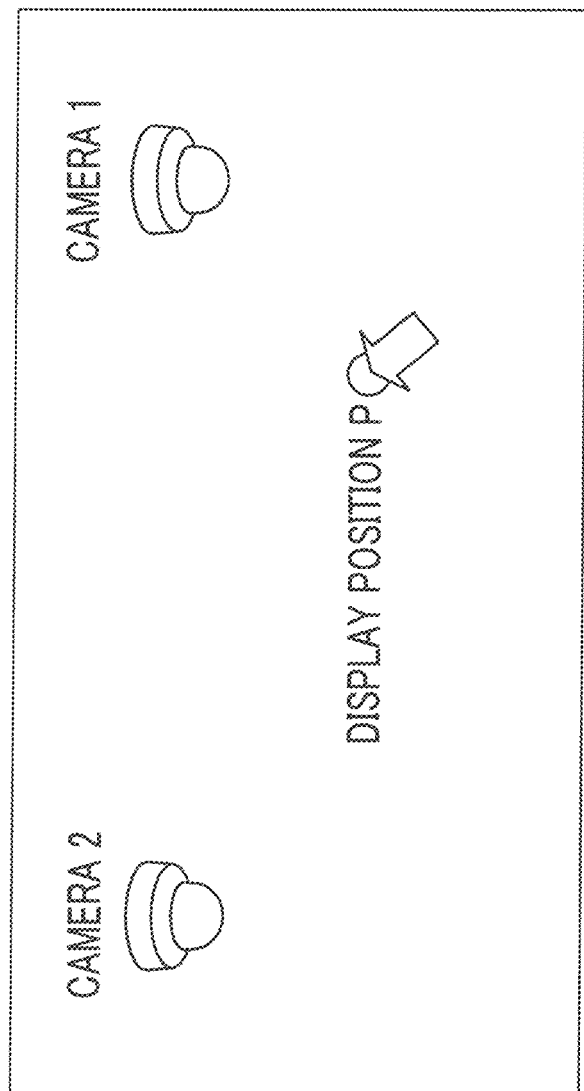
FIGS. 10A to 10D illustrate a flow of processing example 4.
Figure 10B:
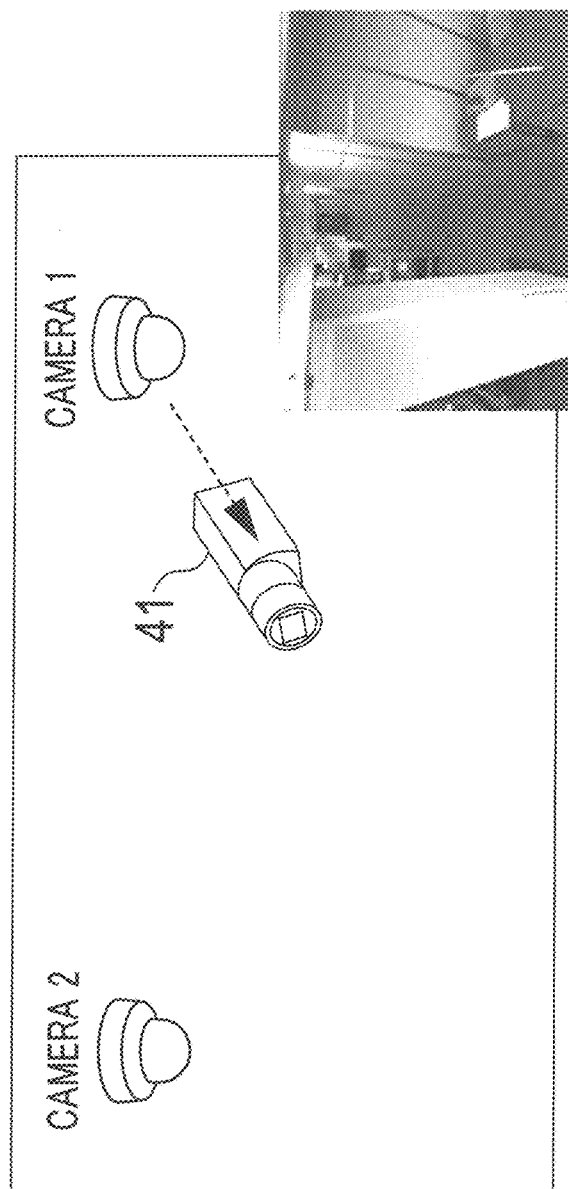

The procedure in FIG. 10A and FIG. 10B is the same as that described in FIG. 7A and FIG. 7B. That is, as shown in FIG. 10A, the user designates display position P. Next, display image formation apparatus 10 sets the orientation of a straight line connecting position Pc1 of camera 1 closest to designated display position P and display position P as the direction of the camera as shown in FIG. 10B, and displays camera icon 41 turned to that direction.

Figure 10C:
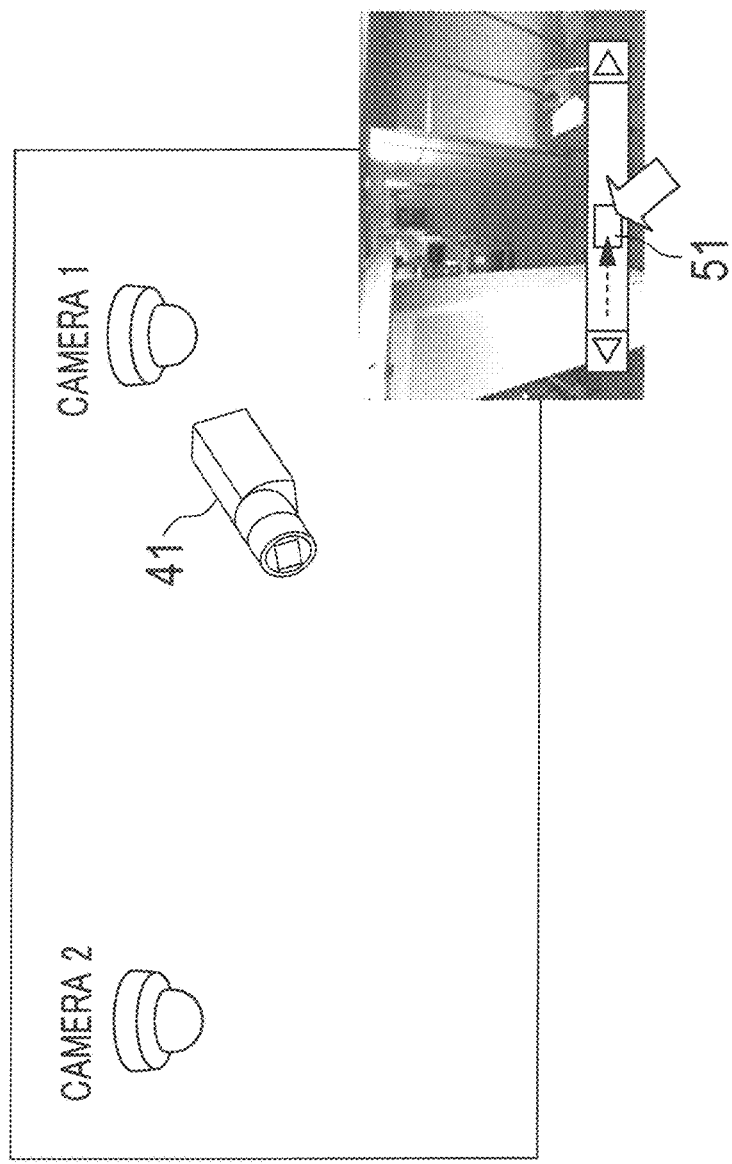

Next, the user moves scroll bar 51 as shown in FIG. 10C. Here, moving scroll bar 51 rightward causes an image closer to the current time to be designated.

Figure 10D:
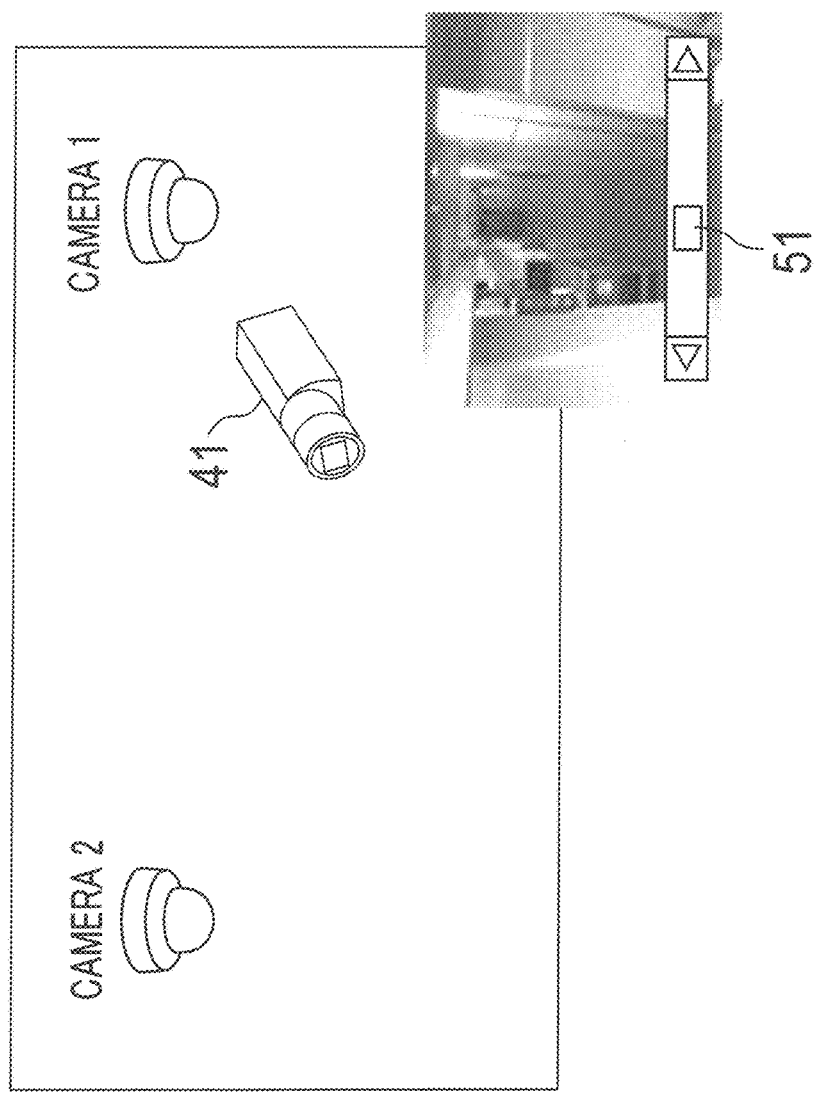

When the user moves scroll bar 51, display image formation apparatus 10 determines an image to be displayed corresponding to the time based on the designated position of scroll bar 51 as shown in FIG. 10D, searches for the place where the image corresponding to the time is stored (camera or server) and displays the image. In the present embodiment, the image in the camera is designated and the image in the camera is displayed. Such processing can be performed by extraction parameter determining section 14.

Note that if a chroma of camera icon 41 is changed according to a designated time, the user can more easily grasp the time corresponding to the image displayed. For example, the chroma may be increased to obtain a more recent image.

A case has been described in this example where scroll bar 51 is displayed on the same screen as the extracted image determined by extraction parameter determining section 14 to designate the time corresponding to the extracted image, and point is that only an image for designating the time corresponding to the extracted image needs to be displayed without being limited to scroll bar 51.

Display image formation apparatus 10 according to the aforementioned embodiment may be configured of a computer such as a personal computer including a memory and a CPU. The function of each component making up display image formation apparatus 10 may be realized by the CPU reading, executing and processing a computer program stored in the memory.

The disclosure of the specification, drawings, and abstract in Japanese Patent Application No. 2012-106735 filed on May 8, 2012 is incorporated herein by reference in its entirety.

INDUSTRIAL APPLICABILITY

The present invention is suitably applicable to a system in which images of a certain region are captured by a plurality of omni-directional cameras and a user designates a desired location from the region.

REFERENCE SIGNS LIST

10 Display image formation apparatus
11 Position designation section
12 Camera selection section
13 Coordinate transformation section
14 Extraction parameter determining section
15 Drawing section
20 Omni-directional camera
22 Extracted image generation section

The invention claimed is:

1. A display image formation apparatus comprising:
a memory that stores instructions; and
a processor that, when executing the instructions stored in the memory, performs operations comprising:
selecting an omni-directional camera from a plurality of omni-directional cameras based on a positional relationship between a designated position on a plan map and positions of the plurality of omni-directional cameras;
determining an enlargement amount of an image region, as a parameter, to extract the image region from an omni-directional image captured by the selected omni-directional camera for display, according to a distance, in a plane of the omni-directional image, from a center of the omni-directional image captured by the selected omni-directional camera to the designated position in the omni-directional image;
determining the image region having the determined enlargement amount in the omni-directional image captured by the selected omni-directional camera using the parameter;
extracting the determined image region from the omni-directional image;
enlarging the extracted image region having the determined enlargement amount;
generating a display image including the enlarged extracted image region overlapping the plan map; and
outputting the generated display image to a display,
wherein the image region is determined such that, as a size of the image region extracted from the omni-directional image captured by the selected omni-directional camera increases, the distance from the center of the captured omni-directional image, in the plane of the captured omni-directional image, becomes shorter and the enlargement amount decreases, and the extracted image region is processed by pixel interpolation to enlarge the extracted image region.

2. The display image formation apparatus according to claim 1, wherein the enlargement amount of the extracted image region increases, as the distance increases.

3. The display image formation apparatus according to claim 1, wherein, while the designated position is being dragged, the selected omni-directional camera is maintained and an other omni-directional camera is not selected.

4. The display image formation apparatus according to claim 1, wherein, when the selected omni-directional camera is changed, an angle of view of the image region is increased to a wide angle before and after the change of the selected omni-directional camera.

5. The display image formation apparatus according to claim 1, wherein the omni-directional camera is selected based on the designated position designated by a user and a sight line direction designated by the user.

6. The display image formation apparatus according to claim 5, wherein the display image further includes a camera icon overlapping the plan map, the camera icon being provided for designating the sight line direction.

7. The display image formation apparatus according to claim 1, wherein the display image further includes a field of view corresponding to the extracted image region, the field of view overlapping the plan map.

8. The display image formation apparatus according to claim 1, wherein the display image further includes a time designation image for designating a time corresponding to the extracted image region, the time designation image and the extracted image being displayed together.

9. A display image formation method comprising:
selecting an omni-directional camera from a plurality of omni-directional cameras based on a positional relationship between a designated position on a plan map and positions of the plurality of omni-directional cameras;
determining an enlargement amount of an image region, as a parameter, to extract the image region from an omni-directional image captured by the selected omni-directional camera for display, according to a distance, in a plane of the omni-directional image, from a center of the omni-directional image captured by the selected omni-directional camera to the designated position in the omni-directional image;

determining the image region having the determined enlargement amount in the omni-directional image captured by the selected omni-directional camera using the parameter;

extracting the determined image region from the omni-directional image;

enlarging the extracted image region having the determined enlargement amount;

generating a display image including the enlarged extracted image region overlapping the plan map; and outputting the generated display image to a display, wherein the image region is determined such that, as a size of the image region extracted from the omni-directional image captured by the selected omni-directional camera increases, the distance from the center of the captured omni-directional image, in the plane of the captured omni-directional image, becomes shorter and the enlargement amount decreases, and the extracted image region is processed by pixel interpolation to enlarge the extracted image region.

10. The display image formation apparatus according to claim 9, wherein the extracted determined image region is enlarged such that a size of the enlarged extracted determined image region included in the display image remains constant regardless of the size of the extracted image region.

11. The display image formation apparatus according to claim 1, further comprising the display that displays the generated display image.

* * * * *